(12) United States Patent
Venkataswami et al.

(10) Patent No.: US 8,599,865 B2
(45) Date of Patent: Dec. 3, 2013

(54) SYSTEM AND METHOD FOR PROVISIONING FLOWS IN A MOBILE NETWORK ENVIRONMENT

(75) Inventors: Balaji Venkat Venkataswami, TamilNadu (IN); Kowsalya Subramanian, TamilNadu (IN); Jegan Kumar Somi Ramasamy Subramanian, TamilNadu (IN); Manikandan Dhayalan, TamilNadu (IN); Rajesh Kumar Andhavaram, TamilNadu (IN); Girish Sivasubramanian, TamilNadu (IN)

(73) Assignee: Cisco Technology, Inc., San Jose, CA (US)

( * ) Notice: Subject to any disclaimer, the term of this patent is extended or adjusted under 35 U.S.C. 154(b) by 340 days.

(21) Appl. No.: 12/912,556

(22) Filed: Oct. 26, 2010

(65) Prior Publication Data

US 2012/0099538 A1  Apr. 26, 2012

(51) Int. Cl.
  *H04L 12/28* (2006.01)
  *G06F 15/16* (2006.01)
(52) U.S. Cl.
  USPC .......................................... 370/401; 709/227
(58) Field of Classification Search
  USPC ....................................................... 370/401
  See application file for complete search history.

(56) References Cited

U.S. PATENT DOCUMENTS

| | | |
|---|---|---|
| 2,911,462 A | 11/1959 | Brady |
| D212,798 S | 11/1968 | Dreyfuss |
| 3,793,489 A | 2/1974 | Sank |
| 3,909,121 A | 9/1975 | De Mesquita Cardoso |
| 4,400,724 A | 8/1983 | Fields |
| 4,473,285 A | 9/1984 | Winter |
| 4,494,144 A | 1/1985 | Brown |
| 4,750,123 A | 6/1988 | Christian |
| 4,815,132 A | 3/1989 | Minami |
| 4,827,253 A | 5/1989 | Maltz |

(Continued)

FOREIGN PATENT DOCUMENTS

| | | |
|---|---|---|
| CN | 101953158 A | 1/2011 |
| CN | 102067593 | 5/2011 |
| EP | 502600 A2 | 9/1992 |
| EP | 0 650 299 | 10/1994 |

(Continued)

OTHER PUBLICATIONS

U.S. Appl. No. 12/366,593, filed Feb. 5, 2009, entitled "System and Method for Depth Perspective Image Rendering," Inventor(s): J. William Mauchly et al.

(Continued)

*Primary Examiner* — Shaq Taha
(74) *Attorney, Agent, or Firm* — Patent Capital Group

(57) ABSTRACT

An example method is provided and includes receiving a request from a mobile node for an Internet protocol (IP) address and establishing a point-to-point (PPP) link for the mobile node. The method also includes provisioning a first tunnel associated with a first communication flow for the mobile node, and provisioning a sub-tunnel with the first tunnel for a second communication flow. The second communication flow is associated with a high priority type of data to be transported on the sub-tunnel. In more specific embodiments, a call admission control (CAC) mechanism is used to establish the sub-tunnel with the first tunnel for the second communication flow. Additionally, an inner label is installed in a header of a packet associated with the second communication flow in order to identify the sub-tunnel.

20 Claims, 14 Drawing Sheets

(56) References Cited

U.S. PATENT DOCUMENTS

| | | |
|---|---|---|
| 4,853,764 A | 8/1989 | Sutter |
| 4,890,314 A | 12/1989 | Judd et al. |
| 4,961,211 A | 10/1990 | Tsugane et al. |
| 4,994,912 A | 2/1991 | Lumelsky et al. |
| 5,003,532 A | 3/1991 | Ashida et al. |
| 5,020,098 A | 5/1991 | Celli |
| 5,136,652 A | 8/1992 | Jibbe et al. |
| 5,187,571 A | 2/1993 | Braun et al. |
| 5,200,818 A | 4/1993 | Neta et al. |
| 5,249,035 A | 9/1993 | Yamanaka |
| 5,255,211 A | 10/1993 | Redmond |
| D341,848 S | 11/1993 | Bigelow et al. |
| 5,268,734 A | 12/1993 | Parker et al. |
| 5,317,405 A | 5/1994 | Kuriki et al. |
| 5,337,363 A | 8/1994 | Platt |
| 5,347,363 A | 9/1994 | Yamanaka |
| 5,351,067 A | 9/1994 | Lumelsky et al. |
| 5,359,362 A | 10/1994 | Lewis et al. |
| D357,468 S | 4/1995 | Rodd |
| 5,406,326 A | 4/1995 | Mowry |
| 5,423,554 A | 6/1995 | Davis |
| 5,446,834 A | 8/1995 | Deering |
| 5,448,287 A | 9/1995 | Hull |
| 5,467,401 A | 11/1995 | Nagamitsu et al. |
| 5,495,576 A | 2/1996 | Ritchey |
| 5,502,481 A | 3/1996 | Dentinger et al. |
| 5,502,726 A | 3/1996 | Fischer |
| 5,506,604 A | 4/1996 | Nally et al. |
| 5,532,737 A | 7/1996 | Braun |
| 5,541,639 A | 7/1996 | Takatsuki et al. |
| 5,541,773 A | 7/1996 | Kamo et al. |
| 5,570,372 A | 10/1996 | Shaffer |
| 5,572,248 A | 11/1996 | Allen et al. |
| 5,587,726 A | 12/1996 | Moffat |
| 5,612,733 A | 3/1997 | Flohr |
| 5,625,410 A | 4/1997 | Washino et al. |
| 5,666,153 A | 9/1997 | Copeland |
| 5,673,401 A | 9/1997 | Volk et al. |
| 5,675,374 A | 10/1997 | Kohda |
| 5,715,377 A | 2/1998 | Fukushima et al. |
| D391,935 S | 3/1998 | Sakaguchi et al. |
| D392,269 S | 3/1998 | Mason et al. |
| 5,729,471 A | 3/1998 | Jain et al. |
| 5,737,011 A | 4/1998 | Lukacs |
| 5,748,121 A | 5/1998 | Romriell |
| 5,760,826 A | 6/1998 | Nayar |
| 5,790,182 A | 8/1998 | Hilaire |
| 5,796,724 A | 8/1998 | Rajamani et al. |
| 5,815,196 A | 9/1998 | Alshawi |
| 5,818,514 A | 10/1998 | Duttweiler et al. |
| 5,821,985 A | 10/1998 | Iizawa |
| 5,889,499 A | 3/1999 | Nally et al. |
| 5,894,321 A | 4/1999 | Downs et al. |
| D410,447 S | 6/1999 | Chang |
| 5,940,118 A | 8/1999 | Van Schyndel |
| 5,940,530 A | 8/1999 | Fukushima et al. |
| 5,953,052 A | 9/1999 | McNelley et al. |
| 5,956,100 A | 9/1999 | Gorski |
| 6,069,658 A | 5/2000 | Watanabe |
| 6,088,045 A | 7/2000 | Lumelsky et al. |
| 6,097,441 A | 8/2000 | Allport |
| 6,101,113 A | 8/2000 | Paice |
| 6,124,896 A | 9/2000 | Kurashige |
| 6,148,092 A | 11/2000 | Qian |
| 6,167,162 A | 12/2000 | Jacquin et al. |
| 6,172,703 B1 | 1/2001 | Lee |
| 6,173,069 B1 | 1/2001 | Daly et al. |
| 6,226,035 B1 | 5/2001 | Korein et al. |
| 6,243,130 B1 | 6/2001 | McNelley et al. |
| 6,249,318 B1 | 6/2001 | Girod et al. |
| 6,256,400 B1 | 7/2001 | Takata et al. |
| 6,266,082 B1 | 7/2001 | Yonezawa et al. |
| 6,266,098 B1 | 7/2001 | Cove et al. |
| 6,285,392 B1 | 9/2001 | Satoda et al. |
| 6,292,575 B1 | 9/2001 | Bortolussi et al. |
| 6,356,589 B1 | 3/2002 | Gebler et al. |
| 6,380,539 B1 | 4/2002 | Edgar |
| 6,424,377 B1 | 7/2002 | Driscoll, Jr. |
| 6,430,222 B1 | 8/2002 | Okadia |
| 6,459,451 B2 | 10/2002 | Driscoll et al. |
| 6,462,767 B1 | 10/2002 | Obata et al. |
| 6,493,032 B1 | 12/2002 | Wallerstein et al. |
| 6,507,356 B1 | 1/2003 | Jackel et al. |
| 6,573,904 B1 | 6/2003 | Chun et al. |
| 6,577,333 B2 | 6/2003 | Tai et al. |
| 6,583,808 B2 | 6/2003 | Boulanger et al. |
| 6,590,603 B2 | 7/2003 | Sheldon et al. |
| 6,591,314 B1 | 7/2003 | Colbath |
| 6,593,955 B1 | 7/2003 | Falcon |
| 6,593,956 B1 | 7/2003 | Potts et al. |
| 6,611,281 B2 | 8/2003 | Strubbe |
| 6,680,856 B2 | 1/2004 | Schreiber |
| 6,693,663 B1 | 2/2004 | Harris |
| 6,694,094 B2 | 2/2004 | Partynski et al. |
| 6,704,048 B1 | 3/2004 | Malkin et al. |
| 6,710,797 B1 | 3/2004 | McNelley et al. |
| 6,751,106 B2 | 6/2004 | Zhang et al. |
| D492,692 S | 7/2004 | Fallon et al. |
| 6,763,226 B1 | 7/2004 | McZeal |
| 6,768,722 B1 | 7/2004 | Katseff et al. |
| 6,771,303 B2 | 8/2004 | Zhang et al. |
| 6,774,927 B1 | 8/2004 | Cohen et al. |
| 6,795,108 B2 | 9/2004 | Jarboe et al. |
| 6,795,558 B2 | 9/2004 | Matsuo et al. |
| 6,798,834 B1 | 9/2004 | Murakami et al. |
| 6,806,898 B1 | 10/2004 | Toyama et al. |
| 6,807,280 B1 | 10/2004 | Stroud et al. |
| 6,831,653 B2 | 12/2004 | Kehlet et al. |
| 6,844,990 B2 | 1/2005 | Artonne et al. |
| 6,853,398 B2 | 2/2005 | Malzbender et al. |
| 6,867,798 B1 | 3/2005 | Wada et al. |
| 6,882,358 B1 | 4/2005 | Schuster et al. |
| 6,888,358 B2 | 5/2005 | Lechner et al. |
| 6,909,438 B1 | 6/2005 | White et al. |
| 6,911,995 B2 | 6/2005 | Ivanov et al. |
| 6,917,271 B2 | 7/2005 | Zhang et al. |
| 6,922,718 B2 | 7/2005 | Chang |
| 6,963,653 B1 | 11/2005 | Miles |
| 6,980,526 B2 | 12/2005 | Jang et al. |
| 6,989,754 B2 | 1/2006 | Kiscanin et al. |
| 6,989,836 B2 | 1/2006 | Ramsey |
| 6,989,856 B2 | 1/2006 | Firestone et al. |
| 6,990,086 B1 | 1/2006 | Holur et al. |
| 7,002,973 B2 | 2/2006 | MeLampy et al. |
| 7,023,855 B2 | 4/2006 | Haumont et al. |
| 7,028,092 B2 | 4/2006 | MeLampy et al. |
| 7,031,311 B2 | 4/2006 | MeLampy et al. |
| 7,043,528 B2 | 5/2006 | Schmitt et al. |
| 7,046,862 B2 | 5/2006 | Ishizaka et al. |
| 7,057,636 B1 | 6/2006 | Cohen-Solal et al. |
| 7,057,662 B2 | 6/2006 | Malzbender |
| 7,061,896 B2 | 6/2006 | Jabbari et al. |
| 7,072,504 B2 | 7/2006 | Miyano et al. |
| 7,072,833 B2 | 7/2006 | Rajan |
| 7,080,157 B2 | 7/2006 | McCanne |
| 7,092,002 B2 | 8/2006 | Ferren et al. |
| 7,111,045 B2 | 9/2006 | Kato et al. |
| 7,126,627 B1 | 10/2006 | Lewis et al. |
| 7,131,135 B1 | 10/2006 | Virag et al. |
| 7,136,651 B2 | 11/2006 | Kalavade |
| 7,139,767 B1 | 11/2006 | Taylor et al. |
| D533,525 S | 12/2006 | Arie |
| D533,852 S | 12/2006 | Ma |
| D534,511 S | 1/2007 | Maeda et al. |
| D535,954 S | 1/2007 | Hwang et al. |
| 7,158,674 B2 | 1/2007 | Suh |
| 7,161,942 B2 | 1/2007 | Chen et al. |
| D539,243 S | 3/2007 | Chiu et al. |
| 7,197,008 B1 * | 3/2007 | Shabtay et al. ............... 370/218 |
| D541,773 S | 5/2007 | Chong et al. |
| D542,247 S | 5/2007 | Kinoshita et al. |
| 7,221,260 B2 | 5/2007 | Berezowski et al. |
| D545,314 S | 6/2007 | Kim |
| 7,239,338 B2 | 7/2007 | Krisbergh et al. |

(56) References Cited

U.S. PATENT DOCUMENTS

| | | |
|---|---|---|
| 7,246,118 B2 | 7/2007 | Chastain et al. |
| D550,635 S | 9/2007 | DeMaio et al. |
| D551,184 S | 9/2007 | Kanou et al. |
| 7,269,292 B2 | 9/2007 | Steinberg |
| 7,274,555 B2 | 9/2007 | Kim et al. |
| D555,610 S | 11/2007 | Yang et al. |
| D559,265 S | 1/2008 | Armstrong et al. |
| D560,681 S | 1/2008 | Fletcher |
| D561,130 S | 2/2008 | Won et al. |
| 7,336,299 B2 | 2/2008 | Kostrzewski |
| D567,202 S | 4/2008 | Rieu Piquet |
| 7,352,809 B2 | 4/2008 | Wenger et al. |
| 7,353,279 B2 | 4/2008 | Durvasula et al. |
| 7,359,731 B2 | 4/2008 | Choksi |
| 7,399,095 B2 | 7/2008 | Rondinelli |
| 7,411,975 B1 | 8/2008 | Mohaban |
| 7,413,150 B1 | 8/2008 | Hsu |
| 7,428,000 B2 | 9/2008 | Cutler et al. |
| D578,496 S | 10/2008 | Leonard |
| 7,440,615 B2 | 10/2008 | Gong et al. |
| 7,450,134 B2 | 11/2008 | Maynard et al. |
| 7,471,320 B2 | 12/2008 | Malkin et al. |
| 7,477,657 B1 | 1/2009 | Murphy et al. |
| D588,560 S | 3/2009 | Mellingen et al. |
| 7,505,036 B1 | 3/2009 | Baldwin |
| 7,518,051 B2 | 4/2009 | Redmann |
| D592,621 S | 5/2009 | Han |
| 7,529,425 B2 | 5/2009 | Kitamura et al. |
| 7,532,230 B2 | 5/2009 | Culbertson et al. |
| 7,532,232 B2 | 5/2009 | Shah et al. |
| 7,534,056 B2 | 5/2009 | Cross et al. |
| 7,545,761 B1 | 6/2009 | Kalbag |
| 7,551,432 B1 | 6/2009 | Bockheim et al. |
| 7,555,141 B2 | 6/2009 | Mori |
| 7,575,537 B2 | 8/2009 | Ellis |
| 7,577,246 B2 | 8/2009 | Idan et al. |
| D602,453 S | 10/2009 | Ding et al. |
| 7,616,226 B2 | 11/2009 | Roessler et al. |
| 7,646,419 B2 | 1/2010 | Cernasov |
| D610,560 S | 2/2010 | Chen |
| 7,679,639 B2 | 3/2010 | Harrell et al. |
| 7,692,680 B2 | 4/2010 | Graham |
| 7,707,247 B2 | 4/2010 | Dunn et al. |
| D615,514 S | 5/2010 | Mellingen et al. |
| 7,710,448 B2 | 5/2010 | De Beer et al. |
| 7,710,450 B2 | 5/2010 | Dhuey et al. |
| 7,714,222 B2 | 5/2010 | Taub et al. |
| 7,715,657 B2 | 5/2010 | Lin et al. |
| 7,719,605 B2 | 5/2010 | Hirasawa et al. |
| 7,719,662 B2 | 5/2010 | Bamji et al. |
| 7,720,277 B2 | 5/2010 | Hattori |
| 7,725,919 B1 | 5/2010 | Thiagarajan et al. |
| D626,102 S | 10/2010 | Buzzard et al. |
| D626,103 S | 10/2010 | Buzzard et al. |
| D628,175 S | 11/2010 | Desai et al. |
| 7,839,434 B2 | 11/2010 | Ciudad et al. |
| D628,968 S | 12/2010 | Desai et al. |
| 7,855,726 B2 | 12/2010 | Ferren et al. |
| 7,861,189 B2 | 12/2010 | Watanabe et al. |
| 7,889,851 B2 | 2/2011 | Shah et al. |
| 7,894,531 B1 | 2/2011 | Cetin et al. |
| D635,569 S | 4/2011 | Park |
| D635,975 S | 4/2011 | Seo et al. |
| 7,939,959 B2 | 5/2011 | Wagoner |
| 7,990,422 B2 | 8/2011 | Ahiska et al. |
| 8,000,559 B2 | 8/2011 | Kwon |
| 8,077,857 B1 | 12/2011 | Lambert |
| 8,081,346 B1 | 12/2011 | Anup et al. |
| 8,086,076 B2 | 12/2011 | Tian et al. |
| 8,130,256 B2 | 3/2012 | Trachtenberg et al. |
| 8,135,068 B1 | 3/2012 | Alvarez |
| 8,179,419 B2 | 5/2012 | Girish et al. |
| 8,219,404 B2 | 7/2012 | Weinberg et al. |
| 8,259,155 B2 | 9/2012 | Marathe et al. |
| D669,086 S | 10/2012 | Boyer et al. |
| D669,088 S | 10/2012 | Boyer et al. |
| 8,299,979 B2 | 10/2012 | Rambo et al. |
| 8,315,466 B2 | 11/2012 | El-Maleh et al. |
| 8,363,719 B2 | 1/2013 | Nakayama |
| 8,436,888 B1 | 5/2013 | Baldino et al. |
| 2002/0047892 A1 | 4/2002 | Gonsalves |
| 2002/0106120 A1 | 8/2002 | Brandenburg et al. |
| 2002/0108125 A1 | 8/2002 | Joao |
| 2002/0114392 A1 | 8/2002 | Sekiguchi et al. |
| 2002/0118890 A1 | 8/2002 | Rondinelli |
| 2002/0131608 A1 | 9/2002 | Lobb et al. |
| 2002/0140804 A1 | 10/2002 | Colmenarez et al. |
| 2002/0149672 A1 | 10/2002 | Clapp et al. |
| 2002/0186528 A1 | 12/2002 | Huang |
| 2002/0196737 A1 | 12/2002 | Bullard |
| 2003/0017872 A1 | 1/2003 | Oishi et al. |
| 2003/0048218 A1 | 3/2003 | Milnes et al. |
| 2003/0071932 A1 | 4/2003 | Tanigaki |
| 2003/0072460 A1 | 4/2003 | Gonopolskiy et al. |
| 2003/0160861 A1 | 8/2003 | Barlow et al. |
| 2003/0179285 A1 | 9/2003 | Naito |
| 2003/0185303 A1 | 10/2003 | Hall |
| 2003/0197687 A1 | 10/2003 | Shetter |
| 2004/0003411 A1 | 1/2004 | Nakai et al. |
| 2004/0032906 A1 | 2/2004 | Lillig |
| 2004/0038169 A1 | 2/2004 | Mandelkern et al. |
| 2004/0061787 A1 | 4/2004 | Liu et al. |
| 2004/0091232 A1 | 5/2004 | Appling, III |
| 2004/0118984 A1 | 6/2004 | Kim et al. |
| 2004/0119814 A1 | 6/2004 | Clisham et al. |
| 2004/0164858 A1 | 8/2004 | Lin |
| 2004/0165060 A1 | 8/2004 | McNelley et al. |
| 2004/0178955 A1 | 9/2004 | Menache et al. |
| 2004/0189463 A1 | 9/2004 | Wathen |
| 2004/0189676 A1 | 9/2004 | Dischert |
| 2004/0196250 A1 | 10/2004 | Mehrotra et al. |
| 2004/0207718 A1 | 10/2004 | Boyden et al. |
| 2004/0218755 A1 | 11/2004 | Marton et al. |
| 2004/0246962 A1 | 12/2004 | Kopeikin et al. |
| 2004/0246972 A1 | 12/2004 | Wang et al. |
| 2004/0254982 A1 | 12/2004 | Hoffman et al. |
| 2004/0260796 A1 | 12/2004 | Sundqvist et al. |
| 2005/0007954 A1 | 1/2005 | Sreemanthula et al. |
| 2005/0024484 A1 | 2/2005 | Leonard |
| 2005/0050246 A1 | 3/2005 | Lakkakorpi et al. |
| 2005/0081160 A1 | 4/2005 | Wee et al. |
| 2005/0110867 A1 | 5/2005 | Schulz |
| 2005/0117022 A1 | 6/2005 | Marchant |
| 2005/0129325 A1 | 6/2005 | Wu |
| 2005/0147257 A1 | 7/2005 | Melchior et al. |
| 2005/0248652 A1 | 11/2005 | Firestone et al. |
| 2005/0268823 A1 | 12/2005 | Bakker et al. |
| 2006/0013495 A1 | 1/2006 | Duan et al. |
| 2006/0017807 A1 | 1/2006 | Lee et al. |
| 2006/0028983 A1 | 2/2006 | Wright |
| 2006/0029084 A1* | 2/2006 | Grayson ............... 370/401 |
| 2006/0038878 A1 | 2/2006 | Takashima et al. |
| 2006/0066717 A1 | 3/2006 | Miceli |
| 2006/0072813 A1 | 4/2006 | Matsumoto et al. |
| 2006/0082643 A1 | 4/2006 | Richards |
| 2006/0093128 A1 | 5/2006 | Oxford |
| 2006/0100004 A1 | 5/2006 | Kim et al. |
| 2006/0104297 A1 | 5/2006 | Buyukkoc et al. |
| 2006/0104470 A1 | 5/2006 | Akino |
| 2006/0120307 A1 | 6/2006 | Sahashi |
| 2006/0121568 A1 | 6/2006 | Drapeau |
| 2006/0125691 A1 | 6/2006 | Menache et al. |
| 2006/0126878 A1 | 6/2006 | Takumai et al. |
| 2006/0152489 A1 | 7/2006 | Sweetser et al. |
| 2006/0152575 A1 | 7/2006 | Amiel et al. |
| 2006/0158509 A1 | 7/2006 | Kenoyer et al. |
| 2006/0168302 A1 | 7/2006 | Boskovic et al. |
| 2006/0170769 A1 | 8/2006 | Zhou |
| 2006/0181607 A1 | 8/2006 | McNelley et al. |
| 2006/0200518 A1 | 9/2006 | Sinclair et al. |
| 2006/0233120 A1 | 10/2006 | Eshel et al. |
| 2006/0256187 A1 | 11/2006 | Sheldon et al. |
| 2006/0284786 A1 | 12/2006 | Takano et al. |
| 2006/0289772 A1 | 12/2006 | Johnson et al. |

(56) References Cited

U.S. PATENT DOCUMENTS

| | | |
|---|---|---|
| 2007/0019621 A1 | 1/2007 | Perry et al. |
| 2007/0039030 A1 | 2/2007 | Romanowich et al. |
| 2007/0040903 A1 | 2/2007 | Kawaguchi |
| 2007/0070177 A1 | 3/2007 | Christensen |
| 2007/0080845 A1 | 4/2007 | Amand |
| 2007/0112966 A1 | 5/2007 | Eftis et al. |
| 2007/0120971 A1 | 5/2007 | Kennedy |
| 2007/0121353 A1 | 5/2007 | Zhang et al. |
| 2007/0140337 A1 | 6/2007 | Lim et al. |
| 2007/0153712 A1 | 7/2007 | Fry et al. |
| 2007/0159523 A1 | 7/2007 | Hillis et al. |
| 2007/0183661 A1 | 8/2007 | El-Maleh et al. |
| 2007/0188597 A1 | 8/2007 | Kenoyer |
| 2007/0189219 A1* | 8/2007 | Navali et al. ............ 370/331 |
| 2007/0192381 A1 | 8/2007 | Padmanabhan |
| 2007/0206091 A1 | 9/2007 | Dunn et al. |
| 2007/0206556 A1 | 9/2007 | Yegani et al. |
| 2007/0206602 A1* | 9/2007 | Halabi et al. ............ 370/395.4 |
| 2007/0217406 A1 | 9/2007 | Riedel et al. |
| 2007/0217500 A1 | 9/2007 | Gao et al. |
| 2007/0229250 A1 | 10/2007 | Recker et al. |
| 2007/0247470 A1 | 10/2007 | Dhuey et al. |
| 2007/0250567 A1 | 10/2007 | Graham et al. |
| 2007/0250620 A1 | 10/2007 | Shah et al. |
| 2007/0273752 A1 | 11/2007 | Chambers et al. |
| 2007/0279483 A1 | 12/2007 | Beers et al. |
| 2007/0279484 A1 | 12/2007 | Derocher et al. |
| 2007/0285505 A1 | 12/2007 | Korneliussen |
| 2008/0043041 A2 | 2/2008 | Hedenstroem et al. |
| 2008/0044064 A1 | 2/2008 | His |
| 2008/0077390 A1 | 3/2008 | Nagao |
| 2008/0084429 A1 | 4/2008 | Wissinger |
| 2008/0136896 A1 | 6/2008 | Graham et al. |
| 2008/0151038 A1 | 6/2008 | Khouri et al. |
| 2008/0153537 A1 | 6/2008 | Khawand et al. |
| 2008/0167078 A1 | 7/2008 | Eibye |
| 2008/0198755 A1* | 8/2008 | Vasseur et al. ............ 370/248 |
| 2008/0208444 A1 | 8/2008 | Ruckart |
| 2008/0212677 A1 | 9/2008 | Chen et al. |
| 2008/0215974 A1 | 9/2008 | Harrison et al. |
| 2008/0218582 A1 | 9/2008 | Buckler |
| 2008/0219268 A1 | 9/2008 | Dennison |
| 2008/0232688 A1 | 9/2008 | Senior et al. |
| 2008/0232692 A1 | 9/2008 | Kaku |
| 2008/0240237 A1 | 10/2008 | Tian et al. |
| 2008/0240571 A1 | 10/2008 | Tian et al. |
| 2008/0246833 A1 | 10/2008 | Yasui et al. |
| 2008/0266380 A1 | 10/2008 | Gorzynski et al. |
| 2008/0267282 A1 | 10/2008 | Kalipatnapu et al. |
| 2008/0297586 A1 | 12/2008 | Kurtz et al. |
| 2008/0298571 A1 | 12/2008 | Kurtz et al. |
| 2008/0303901 A1 | 12/2008 | Variyath et al. |
| 2009/0009593 A1 | 1/2009 | Cameron et al. |
| 2009/0051756 A1 | 2/2009 | Trachtenberg |
| 2009/0115723 A1 | 5/2009 | Henty |
| 2009/0122867 A1 | 5/2009 | Mauchly et al. |
| 2009/0129753 A1 | 5/2009 | Wagenlander |
| 2009/0174764 A1 | 7/2009 | Chadha et al. |
| 2009/0193345 A1 | 7/2009 | Wensley et al. |
| 2009/0207179 A1 | 8/2009 | Huang et al. |
| 2009/0207233 A1 | 8/2009 | Mauchly et al. |
| 2009/0207234 A1 | 8/2009 | Chen et al. |
| 2009/0244257 A1 | 10/2009 | MacDonald et al. |
| 2009/0256901 A1 | 10/2009 | Mauchly et al. |
| 2009/0279476 A1 | 11/2009 | Li et al. |
| 2009/0324023 A1 | 12/2009 | Tian et al. |
| 2010/0008373 A1 | 1/2010 | Xiao et al. |
| 2010/0014530 A1 | 1/2010 | Cutaia |
| 2010/0027907 A1 | 2/2010 | Cherna et al. |
| 2010/0042281 A1 | 2/2010 | Filla |
| 2010/0082557 A1 | 4/2010 | Gao et al. |
| 2010/0118112 A1 | 5/2010 | Nimri et al. |
| 2010/0123770 A1 | 5/2010 | Friel et al. |
| 2010/0149301 A1 | 6/2010 | Lee et al. |
| 2010/0153853 A1 | 6/2010 | Dawes et al. |
| 2010/0171807 A1 | 7/2010 | Tysso |
| 2010/0171808 A1 | 7/2010 | Harrell et al. |
| 2010/0183199 A1 | 7/2010 | Smith et al. |
| 2010/0199228 A1 | 8/2010 | Latta et al. |
| 2010/0201823 A1 | 8/2010 | Zhang et al. |
| 2010/0202285 A1 | 8/2010 | Cohen et al. |
| 2010/0205281 A1 | 8/2010 | Porter et al. |
| 2010/0208078 A1 | 8/2010 | Tian et al. |
| 2010/0225732 A1 | 9/2010 | De Beer et al. |
| 2010/0225735 A1 | 9/2010 | Shaffer et al. |
| 2010/0241845 A1 | 9/2010 | Alonso |
| 2010/0259619 A1 | 10/2010 | Nicholson |
| 2010/0268843 A1 | 10/2010 | Van Wie et al. |
| 2010/0277563 A1 | 11/2010 | Gupta et al. |
| 2010/0283829 A1 | 11/2010 | De Beer et al. |
| 2010/0302345 A1 | 12/2010 | Baldino et al. |
| 2010/0316232 A1 | 12/2010 | Acero et al. |
| 2011/0008017 A1 | 1/2011 | Gausereide |
| 2011/0037636 A1 | 2/2011 | Alexander |
| 2011/0039506 A1 | 2/2011 | Lindahl et al. |
| 2011/0063467 A1 | 3/2011 | Tanaka |
| 2011/0085016 A1 | 4/2011 | Kristiansen et al. |
| 2011/0090303 A1 | 4/2011 | Wu et al. |
| 2011/0109642 A1 | 5/2011 | Chang et al. |
| 2011/0242266 A1 | 10/2011 | Blackburn et al. |
| 2011/0249086 A1 | 10/2011 | Guo et al. |
| 2011/0276901 A1 | 11/2011 | Zambetti et al. |
| 2012/0026278 A1 | 2/2012 | Goodman et al. |
| 2012/0038742 A1 | 2/2012 | Robinson et al. |
| 2012/0106428 A1 | 5/2012 | Schlicht et al. |
| 2012/0143605 A1 | 6/2012 | Thorsen et al. |
| 2012/0169838 A1 | 7/2012 | Sekine |

FOREIGN PATENT DOCUMENTS

| | | |
|---|---|---|
| EP | 0 714 081 | 11/1995 |
| EP | 0 740 177 | 4/1996 |
| EP | 1143745 A2 | 10/2001 |
| EP | 1 178 352 A1 | 6/2002 |
| EP | 1 589 758 A1 | 10/2005 |
| EP | 1701308 A2 | 9/2006 |
| EP | 1768058 A2 | 3/2007 |
| EP | 2073543 A1 | 6/2009 |
| EP | 2255531 | 12/2010 |
| EP | 2277308 | 1/2011 |
| GB | 2 294 605 A | 5/1996 |
| GB | 2336266 | 10/1999 |
| GB | 2355876 A | 5/2001 |
| WO | WO 94/16517 | 7/1994 |
| WO | WO 96/21321 | 7/1996 |
| WO | WO 97/08896 | 3/1997 |
| WO | WO 98/47291 | 10/1998 |
| WO | WO 99/59026 | 11/1999 |
| WO | WO 01/33840 | 5/2001 |
| WO | WO 2005/013001 A2 | 2/2005 |
| WO | WO 2006/072755 | 7/2006 |
| WO | WO2007/106157 | 9/2007 |
| WO | WO2007/123946 | 11/2007 |
| WO | WO 2007/123960 A2 | 11/2007 |
| WO | WO2008/039371 | 4/2008 |
| WO | WO 2008/040258 | 4/2008 |
| WO | WO 2008/101117 A1 | 8/2008 |
| WO | WO 2008/118887 A2 | 10/2008 |
| WO | WO 2009/102503 A2 | 8/2009 |
| WO | WO 2009/120814 A2 | 10/2009 |
| WO | WO 2010/059481 | 5/2010 |
| WO | WO2010/096342 | 8/2010 |
| WO | WO 2010/104765 | 9/2010 |
| WO | WO 2010/132271 | 11/2010 |
| WO | WO2012/033716 | 3/2012 |
| WO | WO2012/068008 | 5/2012 |
| WO | WO2012/068010 | 5/2012 |
| WO | WO2012/068485 | 5/2012 |

OTHER PUBLICATIONS

U.S. Appl. No. 12/727,089, filed Mar. 18, 2010, entitled "System and Method for Enhancing Video Images in a Conferencing Environment," Inventor: Joseph T. Friel.

(56) References Cited

OTHER PUBLICATIONS

U.S. Appl. No. 12/781,722, filed May 17, 2010, entitled "System and Method for Providing Retracting Optics in a Video Conferencing Environment," Inventor(s): Joseph T. Friel, et al.
U.S. Appl. No. 12/877,833, filed Sep. 8, 2010, entitled "System and Method for Skip Coding During Video Conferencing in a Network Environment," Inventor(s): Dihong Tian, et al.
U.S. Appl. No. 12/870,687, filed Aug. 27, 2010, entitled "System and Method for Producing a Performance Via Video Conferencing in a Network Environment," Inventor(s): Michael A. Arnao et al.
U.S. Appl. No. 12/949,614, filed Nov. 18, 2010, entitled "System and Method for Managing Optics in a Video Environment," Inventors: Torence Lu, et al.
U.S. Appl. No. 12/873,100, filed Aug. 31, 2010, entitled "System and Method for Providing Depth Adaptive Video Conferencing," Inventor(s): J. William Mauchly et al.
U.S. Appl. No. 12/946,679, filed Nov. 15, 2010, entitled "System and Method for Providing Camera Functions in a Video Environment," Inventors: Peter A.J. Fornell, et al.
U.S. Appl. No. 12/946,695, filed Nov. 15, 2010, entitled "System and Method for Providing Enhanced Audio in a Video Environment," Inventors: Wei Li, et al.
U.S. Appl. No. 12/907,914, filed Oct. 19, 2010, entitled "System and Method for Providing Videomail in a Network Environment," Inventors: David J. Mackie et al.
U.S. Appl. No. 12/950,786, filed Nov. 19, 2010, entitled "System and Method for Providing Enhanced Video Processing in a Network Environment," Inventor[s]: David J. Mackie.
U.S. Appl. No. 12/907,919, filed Oct. 19, 2010, entitled "System and Method for Providing Connectivity in a Network Environment," Inventors: David J. Mackie et al.
U.S. Appl. No. 12/946,704, filed Nov. 15, 2010, entitled "System and Method for Providing Enhanced Graphics in a Video Environment," Inventors: John M. Kanalakis, Jr., et al.
U.S. Appl. No. 12/957,116, filed Nov. 30, 2010, entitled "System and Method for Gesture Interface Control," Inventors: Shuan K. Kirby, et al.
U.S. Appl. No. 13/036,925, filed Feb. 28, 2011, entitled "System and Method for Selection of Video Data in a Video Conference Environment," Inventor(s) Sylvia Olayinka Aya Manfa N'guessan.
U.S. Appl. No. 12/907,925, filed Oct. 19, 2010, entitled "System and Method for Providing a Pairing Mechanism in a Video Environment," Inventors: Gangfeng Kong et al.
U.S. Appl. No. 12/939,037, filed Nov. 3, 2010, entitled "System and Method for Managing Flows in a Mobile Network Environment," Inventors: Balaji Venkat Venkataswami et al.
U.S. Appl. No. 12/946,709, filed Nov. 15, 2010, entitled "System and Method for Providing Enhanced Graphics in a Video Environment," Inventors: John M. Kanalakis, Jr., et al.
U.S. Appl. No. 12/784,257, filed May 20, 2010, entitled "Implementing Selective Image Enhancement," Inventors: Dihong Tian et al.
Design U.S. Appl. No. 29/375,624, filed Sep. 24, 2010, entitled "Mounted Video Unit," Inventor(s): Ashok T. Desai et al.
Design U.S. Appl. No. 29/375,627, filed Sep. 24, 2010, entitled "Mounted Video Unit," Inventor(s): Ashok T. Desai et al.
Design U.S. Appl. No. 29/369,951, filed Sep. 15, 2010, entitled "Video Unit with Integrated Features," Inventor(s): Kyle A. Buzzard et al.
Design U.S. Appl. No. 29/375,458, filed Sep. 22, 2010, entitled "Video Unit with Integrated Features," Inventor(s): Kyle A. Buzzard et al.
Design U.S. Appl. No. 29/375,619, filed Sep. 24, 2010, entitled "Free-Standing Video Unit," Inventor(s): Ashok T. Desai et al.
Design U.S. Appl. No. 29/381,245, filed Dec. 16, 2010, entitled "Interface Element," Inventor(s): John M. Kanalakis, Jr., et al.
Design U.S. Appl. No. 29/381,250, filed Dec. 16, 2010, entitled "Interface Element," Inventor(s): John M. Kanalakis, Jr., et al.
Design U.S. Appl. No. 29/381,254, filed Dec. 16, 2010, entitled "Interface Element," Inventor(s): John M. Kanalakis, Jr., et al.
Design U.S. Appl. No. 29/381,256, filed Dec. 16, 2010, entitled "Interface Element," Inventor(s): John M. Kanalakis, Jr., et al.
Design U.S. Appl. No. 29/381,259, filed Dec. 16, 2010, entitled "Interface Element," Inventor(s): John M. Kanalakis, Jr., et al.
Design U.S. Appl. No. 29/381,260, filed Dec. 16, 2010, entitled "Interface Element," Inventor(s): John M. Kanalakis, Jr., et al.
Design U.S. Appl. No. 29/381,262, filed Dec. 16, 2010, entitled "Interface Element," Inventor(s): John M. Kanalakis, Jr., et al.
Design U.S. Appl. No. 29/381,264, filed Dec. 16, 2010, entitled "Interface Element," Inventor(s): John M. Kanalakis, Jr., et al.
Bakstein, Hynek, et al., "Visual Fidelity of Image Based Rendering," Center for Machine Perception, Czech Technical University, Proceedings of the Computer Vision, Winter 2004, http://www.benogo.dk/publications/Bakstein-Pajdla-CVWW04.pdf; 10 pages.
Beesley, S.T.C., et al., "Active Macroblock Skipping in the H.264 Video Coding Standard," in Proceedings of 2005 Conference on Visualization, Imaging, and Image Processing—VIIP 2005, Sep. 7-9, 2005, Benidorm, Spain, Paper 480-261. ACTA Press, ISBN: 0-88986-528-0; 5 pages.
Berzin, O., et al., "Mobility Support Using MPLS and MP-BGP Signaling," Network Working Group, Apr. 28, 2008, 60 pages; http://www.potaroo.net/ietf/all-/draft-berzin-malis-mpls-mobility-01.txt.
Boccaccio, Jeff; CEPro, "Inside HDMI CEC: The Little-Known Control Feature," Dec. 28, 2007; http://www.cepro.com/article/print/inside_hdmi_cec_the_little_known_control_feature; 2 pages.
Boros, S., "Policy-Based Network Management with SNMP," Proceedings of the EUNICE 2000 Summer School Sep. 13-15, 2000, p. 3.
Bücken R: "Bildfernsprechen: Videokonferenz vom Arbeitsplatz aus" Funkschau, Weka Fachzeitschriften Verlag, Poing, DE, No. 17, Aug. 14, 1986, pp. 41-43, XP002537729; ISSN: 0016-2841, p. 43, left-hand column, line 34-middle column, line 24.
Chan, Eric, et al., "Experiments on block-matching techniques for video coding," Multimedia Systems; 9 Springer-Verlag 1994, Multimedia Systems (1994) 2 pp. 228-241.
Chen et al., "Toward a Compelling Sensation of Telepresence: Demonstrating a Portal to a Distant (Static) Office," Proceedings Visualization 2000; VIS 2000; Salt Lake City, UT, Oct. 8-13, 2000; Annual IEEE Conference on Visualization, Los Alamitos, CA; IEEE Comp. Soc., US, Jan. 1, 2000, pp. 327-333; http://citeseerx.ist.psu.edu/viewdoc/summary?doi=10.1.1.35.1287.
Chen, Jason, "iBluetooth Lets iPhone Users Send and Receive Files Over Bluetooth," Mar. 13, 2009; http://i.gizmodo.com/5169545/ibluetooth-lets-iphone-users-send-and-receive-files-over-bluetooth; 1 page.
Chen, Qing, et al., "Real-time Vision-based Hand Gesture Recognition Using Haar-like Features," Instrumentation and Measurement Technology Conference, Warsaw, Poland, May 1-3, 2007, 6 pages; http://www.google.com/url?sa=t&source=web&cd=1&ved=0CB4QFjAA&url=http%3A%2F%2Fciteseerx.ist.psu.edu%2Fviewdoc%2Fdownload%3Fdoi%3D10.1.1.93.103%26rep%3Drep1%26type%3Dpdf&ei=A28RTLKRDeftnQeXzZGRAw&usg=AFQjCNHpwj5MwjgGp-3goVzSWad6CO-Jzw.
Cisco: Bill Mauchly and Mod Marathe; UNC: Henry Fuchs, et al., "Depth-Dependent Perspective Rendering," Apr. 15, 2008; 6 pages.
Costa, Cristina, et al., "Quality Evaluation and Nonuniform Compression of Geometrically Distorted Images Using the Quadtree Distorsion Map," EURASIP Journal on Applied Signal Processing, Jan. 7, 2004, vol. 2004, No. 12; © 2004 Hindawi Publishing Corp.; XP002536356; ISSN: 1110-8657; pp. 1899-1911; http://downloads.hindawi.com/journals/asp/2004/470826.pdf.
Criminisi, A., et al., "Efficient Dense-Stereo and Novel-view Synthesis for Gaze Manipulation in One-to-one Teleconferencing," Technical Rpt MSR-TR-2003-59, Sep. 2003 [retrieved and printed on Feb. 26, 2009], http://research.microsoft.com/pubs/67266/criminis_techrep2003-59.pdf, 41 pages.
Cumming, Jonathan, "Session Border Control in IMS, An Analysis of the Requirements for Session Border Control in IMS Networks," Sections 1.1, 1.1.1, 1.1.3, 1.1.4, 2.1.1, 3.2, 3.3.1, 5.2.3 and pp. 7-8, Data Connection, 2005.
Daly, S., et al., "Face-based visually-optimized image sequence coding," Image Processing, 1998. ICIP 98. Proceedings; 1998 Interna-

(56) References Cited

OTHER PUBLICATIONS tional Conference on Chicago, IL; Oct. 4-7, 1998, Los Alamitos; IEEE Computing; vol. 3, Oct. 4, 1998; ISBN: 978-0-8186-8821-8; XP010586786; pp. 443-447.
Diaz, Jesus, "Zcam 3D Camera is Like Wii Without Wiimote and Minority Report Without Gloves," Dec. 15, 2007; http://gizmodo.com/gadgets/zcam-depth-camera-could-be-wii-challenger/zcam-3d-camera-is-like-wii-without-wiimote-and-minority-report-without-gloves-334426.php; 3pages.
Diaz, Jesus, iPhone Bluetooth File Transfer Coming Soon (YES!); Jan. 26, 2009; http://i.gizmodo.com/5138797/iphone-bluetooth-file-transfer-coming-soon-yes; 1page.
Digital Video Enterprises, "DVE Eye Contact Silhouette," 1 page, © DVE 2008; http://www.dvetelepresence.com/products/eyeContactSilhouette.asp.
DVE Digital Video Enterprises, "DVE Tele-Immersion Room," [retrieved and printed on Feb. 5, 2009] http://www.dvetelepresence.com/products/immersion_room.asp; 2 pages.
Dynamic Displays, copyright 2005-2008 [retrieved and printed on Feb. 24, 2009] http://www.zebraimaging.com/html/lighting_display.html, 2 pages.
ECmag.com, "IBS Products," Published Apr. 2009; http://www.ecmag.com/index.cfm?fa=article&articleID=10065; 2 pages.
Eisert, Peter, "Immersive 3-D Video Conferencing: Challenges, Concepts and Implementations," Proceedings of SPIE Visual Communications and Image Processing (VCIP), Lugano, Switzerland, Jul. 2003; 11 pages; http://iphome.hhi.de/eisert/papers/vcip03.pdf.
eJamming Audio, Learn More; [retrieved and printed on May 27, 2010] http://www.ejamming.com/learnmore/; 4 pages.
Electrophysics Glossary, "Infrared Cameras, Thermal Imaging, Night Vision, Roof Moisture Detection," [retrieved and printed on Mar. 18, 2010] http://www.electrophysics.com/Browse/Brw_Glossary.asp; 11 pages.
Farrukh, A., et al., Automated Segmentation of Skin-Tone Regions in Video Sequences, Proceedings IEEE Students Conference, ISCON_apos_02; Aug. 16-17, 2002; pp. 122-128.
Fiala, Mark, "Automatic Projector Calibration Using Self-Identifying Patterns," National Research Council of Canada, Jun. 20-26, 2005; http://www.procams.org/procams2005/papers/procams05-36.pdf; 6 pages.
Foote, J., et al., "Flycam: Practical Panoramic Video and Automatic Camera Control," in Proceedings of IEEE International Conference on Multimedia and Expo, vol. III, Jul. 30, 2000; pp. 1419-1422; http://citeseerx.ist.psu.edu/viewdoc/versions?doi=10.1.1.138.8686.
U.S. Appl. No. 13/096,772, filed Apr. 28, 2011, entitled "System and Method for Providing Enhanced Eye Gaze in a Video Conferencing Environment," Inventor(s): Charles C. Byers.
U.S. Appl. No. 13/106,002, filed May 12, 2011, entitled "System and Method for Video Coding in a Dynamic Environment," Inventors: Dihong Tian et al.
U.S. Appl. No. 13/098,430, filed Apr. 30, 2011, entitled "System and Method for Transferring Transparency Information in a Video Environment," Inventors: Eddie Collins et al.
U.S. Appl. No. 13/096,795, filed Apr. 28, 2011, entitled "System and Method for Providing Enhanced Eye Gaze in a Video Conferencing Environment," Inventors: Charles C. Byers.
U.S. Appl. No. 13/298,022, filed Nov. 16, 2011, entitled "System and Method for Alerting a Participant in a Video Conference," Inventor(s): TiongHu Lian, et al.
Design U.S. Appl. No. 29/389,651, filed Apr. 14, 2011, entitled "Video Unit With Integrated Features," Inventor(s): Kyle A. Buzzard et al.
EPO Communication dated Feb. 25, 2011 for EP09725288.6 (published as EP22777308); 4 pages.
EPO Aug. 15, 2011 Response to EPO Communication mailed Feb. 25, 2011 from European Patent Application No. 09725288.6; 15 pages.
PCT Sep. 25, 2007 Notification of Transmittal of the International Search Report from PCT/US06/45895.
PCT Sep. 2, 2008 International Preliminary Report on Patentability (1 page) and the Written Opinion of th ISA (4 pages) from PCT/US2006/045895.
PCT Sep. 11, 2008 Notification of Transmittal of the International Search Report from PCT/US07/09469.
PCT Nov. 4, 2008 International Preliminary Report on Patentability (1 page) and the Written Opinion of the ISA (8 pages) from PCT/US2007/009469.
PCT May 11, 2010 International Search Report from PCT/US2010/024059; 4 pages.
PCT Aug. 23, 2011 International Preliminary Report on Patentability and Written Opinion of the ISA from PCT/US2010/024059; 6 pages.
PCT Sep. 13, 2011 International Preliminary Report on Patentability and the Written Opinion of the ISA from PCT/US2010/026456; 5 pages.
PCT Oct. 12, 2011 International Search Report and Written Opinion of the ISA from PCT/US2011/050380.
PCT Nov. 24, 2011 International Preliminary Report on Patentability from International Application Serial No. PCT/US2010/033880; 6 pages.
Dornaika F., et al., "Head and Facial Animation Tracking Using Appearance-Adaptive Models and Particle Filters," Jun. 2-27, 2002, 22 pages; HEUDIASY Research Lab, http://eprints.pascal-network.org/archive/00001231/01/rtvhci_chapter8.pdf.
Hammadi, Nait Charif et al., "Tracking the Activity of Participants in a Meeting," Machine Vision and Applications, Springer, Berlin, De Lnkd—DOI:10.1007/S00138-006-0015-5, vol. 17, No. 2, May 1, 2006, pp. 83-93, XP019323925 http://citeseerx.ist.psu.edu/viewdoc/summary?doi=10.1.1.106.9832.
Gemmell, Jim, et al., "Gaze Awareness for Video-conferencing: A Software Approach," IEEE MultiMedia, Oct.-Dec. 2000; vol. 7, No. 4, pp. 26-35.
Kwolek, B., "Model Based Facial Pose Tracking Using a Particle Filter," Geometric Modeling and Imaging—New Trends, 2006 London, England Jul. 5-6, 2005, Piscataway, NJ, USA, IEEE LNKD-DOI: 10.1109/GMAI.2006.34 Jul. 5, 2006, pp. 203-208; XP010927285 [Abstract Only].
Chien et al., "Efficient moving Object Segmentation Algorithm Using Background Registration Technique," IEEE Transactions on Circuits and Systems for Video Technology, vol. 12, No. 7, Jul. 2002, 10 pages.
France Telecom R&D, "France Telecom's Magic Telepresence Wall—Human Productivity Lab," 5 pages, retrieved and printed on May 17, 2010; http://www.humanproductivitylab.com/archive_blogs/2006/07/11/france_telecoms_magic_telepres_1.php.
Freeman, Professor Wilson T., Computer Vision Lecture Slides, "6.869 Advances in Computer Vision: Learning and Interfaces," Spring 2005; 21 pages.
Garg, Ashutosh, et al., "Audio-Visual ISpeaker Detection Using Dynamic Bayesian Networks," IEEE International Conference on Automatic Face and Gesture Recognition, 2000 Proceedings, 7 pages; http://www.ifp.illinois.edu/~ashutosh/papers/FG00.pdf.
Geys et al., "Fast Interpolated Cameras by Combining a GPU Based Plane Sweep With a Max-Flow Regularisation Algorithm," Sep. 9, 2004; 3D Data Processing, Visualization and Transmission 2004, pp. 534-541.
Gluckman, Joshua, et al., "Rectified Catadioptric Stereo Sensors," 8 pages, retrieved and printed on May 17, 2010; http://cis.poly.edu/~gluckman/papers/cvpr00.pdf.
Gotchev, Atanas, "Computer Technologies for 3D Video Delivery for Home Entertainment," International Conference on Computer Systems and Technologies; CompSysTech, Jun. 12-13, 2008; http://ecet.ecs.ru.acad.bg/cst08/docs/cp/Plenary/P.1.pdf; 6 pages.
Gries, Dan, "3D Particles Experiments in AS3 and Flash CS3, Dan's Comments," [retrieved and printed on May 24, 2010] http://www.flashandmath.com/advanced/fourparticles/notes.html; 3 pages.
Guernsey, Lisa, "Toward Better Communication Across the Language Barrier," Jul. 29, 1999; http://www.nytimes.com/1999/07/29/technology/toward-better-communication-across-the-language-barrier.html; 2 pages.
Guili, D., et al., "Orchestra!: A Distributed Platform for Virtual Musical Groups and Music Distance Learning over the Internet in JavaTM

(56) References Cited

OTHER PUBLICATIONS

Technology" ; [retrieved and printed on Jun. 6, 2010] http://ieeexplore.ieee.org/stamp/stamp.jsp?tp=&arnumber=778626; 2 pages.
Gundavelli, S., et al., "Proxy Mobile IPv6," Network Working Group, RFC 5213, Aug. 2008, 93 pages; http://tools.ietf.org/pdf/rfc5213.pdf.
Gussenhoven, Carlos, "Chapter 5 Transcription of Dutch Intonation," Nov. 9, 2003, 33 pages; http://www.ru.nl/publish/pages/516003/todisun-ah.pdf.
Gvili, Ronen et al., "Depth Keying," 3DV System Ltd., [Retrieved and printed on Dec. 5, 2011] 11 pages; http://research.microsoft.com/en-us/um/people/eyalofek/Depth%20Key/DepthKey.pdf.
Habili, Nariman, et al., "Segmentation of the Face and Hands in Sign Language Video Sequences Using Color and Motion Cues" IEEE Transaction on Circuits and Systems for Video Technology, IEEE Service Center, vol. 14, No. 8, Aug. 1, 2004; ISSN: 1051-8215; XP011115755; pp. 1086-1097.
He, L., et al., "The Virtual Cinematographer: A Paradigm for Automatic Real-Time Camera Control and Directing," Proc. SIGGRAPH, ©1996; http://research.microsoft.com/en-us/um/people/lhe/papers/siggraph96.vc.pdf; 8 pages.
Hepper, D., "Efficiency Analysis and Application of Uncovered Background Prediction in a Low BitRate Image Coder," IEEE Transactions on Communications, vol. 38, No. 9, pp. 1578-1584, Sep. 1990.
Hock, Hans Henrich, "Prosody vs. Syntax: Prosodic rebracketing of final vocatives in English," 4 pages; [retrieved and printed on Mar. 3, 2011] http://speechprosody2010.illinois.edu/papers/100931.pdf.
Holographic Imaging, "Dynamic Holography for scientific uses, military heads up display and even someday HoloTV Using TI's DMD," [retrieved and printed on Feb. 26, 2009] http://innovation.swmed.edu/ research/instrumentation/res_inst_dev3d.html; 5 pages.
Hornbeck, Larry J., "Digital Light ProcessingTM: A New MEMS-Based Display Technology," [retrieved and printed on Feb. 26, 2009] http://focus.ti.com/pdfs/dlpdmd/17_Digital_Light_Processing_MEMS_display_technology.pdf; 22 pages.
IR Distribution Category @ Envious Technology, "IR Distribution Category," [retrieved and printed on Apr. 22, 2009] http://www.envioustechnology.com.au/ products/product-list.php?CID=305; 2 pages.
IR Trans—Products and Orders—Ethernet Devices, [retrieved and printed on Apr. 22, 2009] http://www.irtrans.de/en/shop/lan.php; 2 pages.
Isgro, Francesco et al., "Three-Dimensional Image Processing in the Future of Immersive Media," IEEE Transactions on Circuits and Systems for Video Technology, vol. 14, No. 3; XP011108796; ISSN: 1051-8215; Mar. 1, 2004; pp. 288-303.
Itoh, Hiroyasu, et al., "Use of a gain modulating framing camera for time-resolved imaging of cellular phenomena," SPIE vol. 2979, 1997, pp. 733-740.
Jamoussi, Bamil, "Constraint-Based LSP Setup Using LDP," MPLS Working Group, Sep. 1999, 34 pages; http://tools.ietf.org/html/draft-ietf-mpls-cr-ldp-03.
Jeyatharan, M., et al., "3GPP TFT Reference for Flow Binding," MEXT Working Group, Mar. 2, 2010, 11 pages; http:/www.ietf.org/id/draft-jeyatharan-mext-flow-tftemp-reference-00.txt.
Jiang, Minqiang, et al., "On Lagrange Multiplier and Quantizer Adjustment for H.264 Frame-layer Video Rate Control," IEEE Transactions on Circuits and Systems for Video Technology, vol. 16, Issue 5, May 2006, pp. 663-669.
Jong-Gook Ko et al., "Facial Feature Tracking and Head Orientation-Based Gaze Tracking," ITC-CSCC 2000, International Technical Conference on Circuits/Systems, Jul. 11-13, 2000, 4 pages http://www.umiacs.umd.edu/~knkim/paper/itc-cscc-2000-jgko.pdf.
Kannangara, C.S., et al., "Complexity Reduction of H.264 Using Lagrange Multiplier Methods," IEEE Int. Conf. on Visual Information Engineering, Apr. 2005; www.rgu.ac.uk/files/h264_complexity_kannangara.pdf; 6 pages.
Kannangara, C.S., et al., "Low Complexity Skip Prediction for H.264 through Lagrangian Cost Estimation," IEEE Transactions on Circuits and Systems for Video Technology, vol. 16, No. 2, Feb. 2006; www.rgu.ac.uk/files/h264_skippredict_richardson_final.pdf; 20 pages.
Kauff, Peter, et al., "An Immersive 3D Video-Conferencing System Using Shared Virtual Team User Environments," Proceedings of the 4th International Conference on Collaborative Virtual Environments, XP040139458; Sep. 30, 2002; http://ip.hhi.de/imedia_G3/assets/pdfs/CVE02.pdf; 8 pages.
Kazutake, Uehira, "Simulation of 3D image depth perception in a 3D display using two stereoscopic displays at different depths," Jan. 30, 2006; http://adsabs.harvard.edu/abs/2006SPIE.6055.408U; 2 pages.
Keijser, Jeroen, et al., "Exploring 3D Interaction in Alternate Control-Display Space Mappings," IEEE Symposium on 3D User Interfaces, Mar. 10-11, 2007, pp. 17-24.
Kim, Y.H., et al., "Adaptive mode decision for H.264 encoder," Electronics letters, vol. 40, Issue 19, pp. 1172-1173, Sep. 2004; 2 pages.
Klint, Josh, "Deferred Rendering in Leadwerks Engine," Copyright Leadwerks Corporation @ 2008; http://www.leadwerks.com/files/Deferred_Rendering_in_Leadwerks_Engine.pdf; 10 pages.
Kollarits, R.V., et al., "34.3: An Eye Contact Camera/Display System for Videophone Applications Using a Conventional Direct-View LCD," © 1995 SID, ISSN0097-0966X/95/2601, pp. 765-768; http://citeseerx.ist.psu.edu/viewdoc/download;jsessionid=47A1E7E028C26503975E633895D114EC?doi=10.1.1.42.1772&rep=rep1&type=pdf.
Kolsch, Mathias, "Vision Based Hand Gesture Interfaces for Wearable Computing and Virtual Environments," A Dissertation submitted in partial satisfaction of the requirements for the degree of Doctor of Philosophy in Computer Science, University of California, Santa Barbara, Nov. 2004, 288 pages http://fulfillment.umi.com/dissertations/b7afbcb56ba72fdb14d26dfccc6b470f/1291487062/3143800.pdf.
Koyama, S., et al. "A Day and Night Vision MOS Imager with Robust Photonic-Crystal-Based RGB-and-IR," Mar. 2008, pp. 754-759; ISSN: 0018-9383; IEE Transactions on Electron Devices, vol. 55, No. 3; http://ieeexplore.ieee.org/stamp/stamp.jsp?tp=&arnumber=4455782&isnumber=4455723.
Lambert, "Polycom Video Communications," ©2004 Polycom, Inc., Jun. 20, 2004 http://www.polycom.com/global/documents/whitepapers/video_communications_h.239_people_content_polycom_patented_technology.pdf.
Lawson, S., "Cisco Plans TelePresence Translation Next Year," Dec. 9, 2008; http://www.pcworld.com/ article/155237/.html?tk=rss_news; 2 pages.
Lee, J. and Jeon, B., "Fast Mode Decision for H.264," ISO/IEC MPEG and ITU-T VCEG Joint Video Team, Doc. JVT-J033, Dec. 2003; http://media.skku.ac.kr/publications/paper/IntC/ljy_ICME2004.pdf; 4 pages.
Liu, Shan, et al., "Bit-Depth Scalable Coding for High Dynamic Range Video," SPIE Conference on Visual Communications and Image Processing, Jan. 2008; 12 pages http://www.merl.com/papers/docs/TR2007-078.pdf.
Liu, Z., "Head-Size Equalization for Better Visual Perception of Video Conferencing," Proceedings, IEEEInternational Conference on Multimedia & Expo (ICME2005), Jul. 6-8, 2005, Amsterdam, The Netherlands; http://research.microsoft.com/users/cohen/HeadSizeEqualizationICME2005.pdf; 4 pages.
Mann, S., et al., "Virtual Bellows: Constructing High Quality Still from Video," Proceedings, First IEEE International Conference on Image Processing ICIP-94, Nov. 13-16, 1994, Austin, TX; http://citeseerx.ist.psu.edu/viewdoc/summary?doi=10.1.1.50.8405; 5 pages.
Marvin Imaging Processing Framework, "Skin-colored pixels detection using Marvin Framework," video clip, YouTube, posted Feb. 9, 2010 by marvinproject, 1 page; http://www.youtube.com/user/marvinproject#p/a/u/0/3ZuQHYNIcrl.
Miller, Gregor, et al., "Interactive Free-Viewpoint Video," Centre for Vision, Speech and Signal Processing, [retrieved and printed on Feb. 26, 2009], http://www.ee.surrey.ac.uk/CVSSP/VMRG/ Publications/miller05cvmp.pdf, 10 pages.
Miller, Paul, "Microsoft Research patents controller-free computer input via EMG muscle sensors," Engadget.com, Jan. 3, 2010, 1 page;

(56) References Cited

OTHER PUBLICATIONS http://www.engadget.com/2010/01/03/microsoft-research-patents-controller-free-computer-input-via-em/.
Minoru from Novo is the worlds first consumer 3D Webcam, Dec. 11, 2008; http://www.minoru3d.com; 4 pages.
Mitsubishi Electric Research Laboratories, copyright 2009 [retrieved and printed on Feb. 26, 2009], http://www.merl.com/projects/3dtv, 2 pages.
Nakaya, Y., et al. "Motion Compensation Based on Spatial Transformations," IEEE Transactions on Circuits and Systems for Video Technology, Jun. 1994, Abstract Only http://ieeexplore.ieee.org/Xplore/login.jsp?url=http%3A%2F%2Fieeexplore.ieee.org%2Fiel5%2F76%2F7495%2F00305878.pdf%3Farnumber%3D305878&authDecision=-203.
National Training Systems Association Home—Main, Interservice/Industry Training, Simulation & Education Conference, Dec. 1-4, 2008; http://ntsa.metapress.com/app/home/main.asp?referrer=default; 1 page.
Oh, Hwang-Seok, et al., "Block-Matching Algorithm Based on Dynamic Search Window Adjustment," Dept. of CS, KAIST, 1997, 6 pages; http://citeseerx.ist.psu.edu/viewdoc/similar?doi=10.1.1.29.8621&type=ab.
Opera Over Cisco TelePresence at Cisco Expo 2009, in Hannover Germany—Apr. 28, 29, posted on YouTube on May 5, 2009; http://www.youtube.com/watch?v=xN5jNH5E-38; 1 page.
"3D Particles Experiments in AS3 and Flash CS3," [retrieved and printed on Mar. 18, 2010]; 2 pages; http://www.flashandmath.com/advanced/fourparticles/notes.html.
3G, "World's First 3G Video Conference Service with New TV Commercial," Apr. 28, 2005, 4 pages; http://www.3g.co.uk/PR/April2005/1383.htm.
"Cisco Expo Germany 2009 Opening," Posted on YouTube on May 4, 2009; http://www.youtube.com/watch?v=SDKsaSlz4MK; 2 pages.
"Eye Tracking," from Wikipedia, (printed on Aug. 31, 2011) 12 pages; http://en.wikipedia.org/wiki/Eye_tracker.
"Infrared Cameras TVS-200-EX," [retrieved and printed on May 24, 2010] http://www.electrophysics.com/Browse/Brw_ProductLineCategory.asp?CategoryID=184&Area=IS; 2 pages.
"RoundTable, 360 Degrees Video Conferencing Camera unveiled by Microsoft," TechShout, Jun. 30, 2006, 1 page; http://www.techshout.com/gadgets/2006/30/roundtable-360-degrees-video-conferencing-camera-unveiled-by-microsoft/#.
"Vocative Case," from Wikipedia, [retrieved and printed on Mar. 3, 2011] 11 pages; http://en.wikipedia.org/wiki/Vocative_case.
"Custom 3D Depth Sensing Prototype System for Gesture Control," 3D Depth Sensing, GestureTek, 3 pages; [Retrieved and printed on Dec. 1, 2010] http://www.gesturetek.com/3ddepth/introduction.php.
"Eye Gaze Response Interface Computer Aid (Erica) tracks Eye movement to enable hands-free computer operation," UMD Communication Sciences and Disorders Tests New Technology, University of Minnesota Duluth, posted Jan. 19, 2005; 4 pages http://www.d.umn.edu/unirel/homepage/05/eyegaze.html.
"Real-time Hand Motion/Gesture Detection for HCI-Demo 2," video clip, YouTube, posted Dec. 17, 2008 by smmy0705, 1 page; www.youtube.com/watch?v=mLT4CFLIi8A&feature=related.
"Simple Hand Gesture Recognition," video clip, YouTube, posted Aug. 25, 2008 by pooh8210, 1 page; http://www.youtube.com/watch?v=F8GVeV0dYLM&feature=related.
Active8-3D—Holographic Projection—3D Hologram Retail Display & Video Project, [retrieved and printed on Feb. 24, 2009], http://www.activ8-3d.co.uk/3d_holocubes; 1 page.
Andersson, L., et al., "LDP Specification," Network Working Group, RFC 3036, Jan. 2001, 133 pages; http://tools.ietf.org/html/rfc3036.
Andreopoulos, Yiannis, et al., "In-Band Motion Compensated Temporal Filtering," Signal Processing: Image Communication 19 (2004) 653-673, 21 pages http://medianetlab.ee.ucla.edu/papers/011.pdf.
Arrington, Michael, "eJamming—Distributed Jamming," TechCrunch; Mar. 16, 2006; http://www.techcrunch.com/2006/03/16/ejamming-distributed-jamming/; 1 page.
Arulampalam, M. Sanjeev, et al., "A Tutorial on Particle Filters for Online Nonlinear/Non-Gaussian Bayesian Tracking," IEEE Transactions on Signal Processing, vol. 50, No. 2, Feb. 2002, 15 pages. http://www.cs.ubc.cat/~murphyk/Software/Kalman/ParticleFilterTutorial.pdf.
Avrithis, Y., et al., "Color-Based Retrieval of Facial Images," European Signal Processing Conference (EUSIPCO '00), Tampere, Finland; Sep. 2000; http://www.image.ece.ntua.gr/~ntsap/presentations/eusipco00.ppt#256; 18 pages.
Awduche, D., et al., "Requirements for Traffic Engineering over MPLS," Network Working Group, RFC 2702, Sep. 1999, 30 pages; http://tools.ietf.org/pdf/rfc2702.pdf.
EPO Nov. 3, 2011 Communication from European Application EP10710949.8; 2 pages.
EPO Mar. 12, 2012 Response to EP Communication dated Nov. 3, 2011 from European Application EP10710949.8; 15 pages.
EPO Mar. 20, 2012 Communication from European Application 09725288.6; 6 pages.
EPO Jul. 10, 2012 Response to EP Communication from European Application EP10723445.2.
EPO Sep. 24, 2012 Response to Mar. 20, 2012 EP Communication from European Application EP09725288.6.
OptoIQ, "Vision + Automation Products—VideometerLab 2," [retrieved and printed on Mar. 18, 2010], http://www.optoiq.com/optoiq-2/en-us/index/machine-vision-imaging-processing/display/vsd-articles-tools-template.articles.vision-systems-design.volume-11.issue-10.departments.new-products.vision-automation-products.htmlhtml; 11 pages.
OptoIQ, "Anti-Speckle Techniques Uses Dynamic Optics," Jun. 1, 2009; http://www.optoiq.com/index/photonics-technologies-applications/lfw-display/lfw-article-display/363444/articles/optoiq2/photonics-technologies/technology-products/optical-components/optical-mems/2009/12/anti-speckle-technique-uses-dynamic-optics/QP129867/cmpid=EnlOptoLFWJanuary132010.html; 2 pages.
OptoIQ, "Smart Camera Supports Multiple Interfaces," Jan. 22, 2009; http://www.optoiq.com/index/machine-vision-imaging-processing/display/vsd-article-display/350639/articles/vision-systems-design/daily-product-2/2009/01/smart-camera-supports-multiple-interfaces.html; 2 pages.
OptoIQ, "Vision Systems Design—Machine Vision and Image Processing Technology," [retrieved and printed on Mar. 18, 2010], http://www.optoiq.com/index/machine-vision-imaging-processing.html; 2 pages.
Patterson, E.K., et al., "Moving-Talker, Speaker-Independent Feature Study and Baseline Results Using the CUAVE Multimodal Speech Corpus," EURASIP Journal on Applied Signal Processing, vol. 11, Oct. 2002, 15 pages http://www.clemson.edu/ces/speech/papers/CUAVE_Eurasip2002.pdf.
Payatagool, Chris, "Orchestral Manoeuvres in the Light of Telepresence," Telepresence Options, Nov. 12, 2008; http://www.telepresenceoptions.com/2008/11/orchestral_manoeuvres; 2pages.
PCT Sep. 18, 2008 PCT International Search Report (4 pages), International Preliminary Report on Patentability (1 page), and Written Opinion of the ISA (7 pages); PCT/US2008/058079; dated Sep. 18, 2008.
PCT Oct. 10, 2009 PCT Notification of Transmittal of the International Search Report and the Written Opinion of the International Searching Authority, or the Declaration; PCT/US2009/038310; dated Oct. 10, 2009; 19 pages.
PCT Apr. 4, 2009 Notification of Transmittal of the International Search Report and the Written Opinion of the International Searching Authority, or the Declaration from PCT/US2009/001070, 17 pages.
PCT Oct. 7, 2010 PCT International Preliminary Report on Patentability mailed Oct. 7, 2010 for PCT/US2009/038310; 10 pages.
PCT Feb. 23, 2010 PCT Notification of Transmittal of the International Search Report and the Written Opinion of the International Searching Authority, or the Declaration for PCT/US2009/064061 mailed Feb. 23, 2010; 14 pages.
PCT Aug. 24, 2010 PCT International Search Report mailed Aug. 24, 2010 for PCT/US2010033880; 4 pages.
PCT Aug. 26, 2010 International Preliminary Report on Patentability mailed Aug. 26, 2010 for PCT/US2009/001070; 10 pages.

(56) References Cited

OTHER PUBLICATIONS

PCT Jan. 32, 2012 International Search Report and Written Opinion of the ISA from International Application Serial No. PCT/US2011/060579; 10 pages.

PCT Jan. 23, 2012 International Search Report and Written Opinion of the ISA from International Application Serial No. PCT/US2011/060584; 11 pages.

PCT Feb. 20, 2012 International Search Report and Written Opinion of the ISA from International Application Serial No. PCT/US2011/061442; 12 pages.

PCT Mar. 21, 2013 International Preliminary Report on Patentability from International Application Serial No. PCT/US2011/050380.

PCT May 30, 2013 International Preliminary Report on Patentability and Written Opinion from the International Searching Authority for International Application Serial No. PCT/US2011/061442 8 pages.

PCT May 30, 2013 International Preliminary Report on Patentability and Written Opinion from the International Searching Authority for International Application Serial No. PCT/US2011/060579 6 pages.

PCT May 30, 2013 International Preliminary Report on Patentability and Written Opinion from the International Searching Authority for International Application Serial No. PCT/US2011/060584 7 pages.

Perez, Patrick, et al., "Data Fusion for Visual Tracking with Particles," Proceedings of the IEEE, vol. XX, No. XX, Feb. 2004, 18 pages http://citeseer.ist.psu.edu/viewdoc/summary?doi=10.1.1.6.2480.

Pixel Tools "Rate Control and H.264: H.264 rate control algorithm dynamically adjusts encoder parameters," [retrieved and printed on Jun. 10, 2010] http://www.pixeltools.om/rate_control_paper.html; 7 pages.

Potamianos, G., et a., "An Image Transform Approach for HMM Based Automatic Lipreading," in Proceedings of IEEE ICIP, vol. 3, 1998, 5 pages http://citeseerx.ist.psu.edu/viewdoc/summary?doi=10.1.1.13.6802.

Radhika, N., et al., "Mobile Dynamic reconfigurable Context aware middleware for Adhoc smart spaces," Academic Open Internet Journal, ISSN 1311-4360, vol. 22, 2008; 3 pages http://www.acadjournal.com/2008/V22/part6/p7.

Rayvel Business-to-Business Products, copyright 2004 [retrieved and printed on Feb. 24, 2009], http://www.rayvel.com/b2b.html; 2 pages.

Richardson, I.E.G., et al., "Fast H.264 Skip Mode Selection Using and Estimation Framework," Picture Coding Symposium, (Beijing, China), Apr. 2006; www.rgu.ac.uk/files/richardsonfast_skip_estmation_pcs06.pdf; 6 pages.

Richardson, Iain, et al., "Video Encoder Complexity Reduction by Estimating Skip Mode Distortion," Image Communication Technology Group; [Retrieved and printed Oct. 21, 2010] 4 pages; http://www4.rgu.ac.uk/files/ICIP04_richardson_zhao_final.pdf.

Rikert, T.D., et al., "Gaze Estimation using Morphable models," IEEE International Conference on Automatic Face and Gesture Recognition, Apr. 1998; 7 pgs http://citeseer.ist.psu.edu/viewdoc/summary?doi=10.1.1.30.9472.

Butler, Darren, et al., "Robust Face Localisation Using Motion, Colour & Fusion" ; Proc. VIIth Digital Image Computing: Techniques and Applications, Sun C. et al (Eds.), Sydney; XP007905630; pp. 899-908; Dec. 10, 2003; http://www.cmis.csiro.au/Hugues.Talbot/dicta2003/cdrom/pdf/0899.pdf.

Satoh, Kiyohide et al., "Passive Depth Acquisition for 3D Image Displays", Ieice Transactions on Information and Systems, Information Systems Society, Tokyo, JP, Sep. 1, 1994, vol. E77-D, No. 9, pp. 949-957.

School of Computing, "Bluetooth over IP for Mobile Phones," 2005; http://www.computing.dcu.ie/wwwadmin/fyp-abstract/list/fyp_details05.jsp?year=2005&number=51470574; 1 page.

Schroeder, Erica, "The Next Top Model—Collaboration," Collaboration, The Workspace: A New World of Communications and Collaboration, Mar. 9, 2009; http//blogs.cisco.com/collaboration/comments/the_next_top_model; 3 pages.

Sena, "Industrial Bluetooth," [retrieved and printed on Apr. 22, 2009] http://www.sena.com/products/industrial_bluetooth; 1 page.

Shaffer, Shmuel, "Translation—State of the Art" presentation; Jan. 15, 2009; 22 pages.

Shi, C. et al., "Automatic Image Quality Improvement for Videoconferencing," IEEE ICASSP May 2004; http://research.microsoft.com/pubs/69079/0300701.pdf; 4 pages.

Shum, H.-Y, et al., "A Review of Image-Based Rendering Techniques," in SPIE Proceedings vol. 4067(3); Proceedings of the Conference on Visual Communications and Image Processing 2000, Jun. 20-23, 2000, Perth, Australia; pp. 2-13; https://research.microsoft.com/pubs/68826/review_image_rendering.pdf.

Smarthome, "IR Extender Expands Your IR Capabilities," [retrieved and printed on Apr. 22, 2009], http://www.smarthome.com/8121.html; 3 pages.

Soliman, H., et al., "Flow Bindings in Mobile IPv6 and NEMO Basic Support," IETF MEXT Working Group, Nov. 9, 2009, 38 pages; http://tools.ietf.org/html/draft-ietf-mext-flow-binding-04.

Sonoma Wireworks Forums, "Jammin on Rifflink," [retrieved and printed on May 27, 2010] http://www.sonomawireworks.com/forums/viewtopic.php?id=2659; 5 pages.

Sonoma Wireworks Rifflink, [retrieved and printed on Jun. 2, 2010] http://www.sonomawireworks.com/rifflink.php; 3 pages.

Soohuan, Kim, et al., "Block-based face detection scheme using face color and motion estimation," Real-Time Imaging VIII; Jan. 20-22, 2004, San Jose, CA; vol. 5297, No. 1; Proceedings of the SPIE—The International Society for Optical Engineering SpPIE-Int. Soc. Opt. Eng USA ISSN: 0277-786X; XP007905596; pp. 78-88.

Sudan, Ranjeet, "Signaling in MPLS Networks with RSVP-TE-Technology Information," Telecommunications, Nov. 2000, 3 pages; http://findarticles.com/p/articles/mi_mOTLC/is_11_34/ai_67447072/.

Sullivan, Gary J., et al., "Video Compression—From Concepts to the H.264/AVC Standard," Proceedings IEEE, vol. 93, No. 1, Jan. 2005 http://ip.hhi.de/imagecom_G1/assets/pdfs/pieee_sullivan_wiegand_2005.pdf; 14 pages.

Sun, X., et al., "Region of Interest Extraction and Virtual Camera Control Based on Panoramic Video Capturing," IEEE Trans. Multimedia, Oct. 27, 2003; http://vision.ece.ucsb.edu/publications/04mmXdsun.pdf; 14 pages.

Super Home Inspectors or Super Inspectors, [retrieved and printed on Mar. 18, 2010] http://www.umrt.com/PageManager/Default.aspx/PageID=2120325; 3 pages.

Tan, Kar-Han, et al., "Appearance-Based Eye Gaze Estimation," In Proceedings IEEE WACV'02, 2002, 5 pages http://citeseer.ist.psu.edu/viewdoc/summary?doi=10.1.1.19.8921.

Total immersion, Video Gallery, copyright 2008-2009 [retrieved and printed on Feb. 26, 2009], http://www.t-immersion.com/en,video-gallery,36.html, 1 page.

Trevor Darrell, "A Real-Time Virtual Mirror Display," 1 page, Sep. 9, 1998; http://people.csail.mit.edu/trevor/papers/1998-021/node6.html.

Trucco, E., et al., "Real-Time Disparity Maps for Immersive 3-D Teleconferencing by Hybrid Recursive Matching and Census Transform," [retrieved and printed on May 4, 2010] http://server.cs.ucf.edu/~vision/papers/VidReg-final.pdf; 9 pages.

Tsapatsoulis, N., et al., "Face Detection for Multimedia Applications," Proceedings of the ICIP Sep. 10-13, 2000, Vancouver, BC, Canada; vol. 2, pp. 247-250.

Tsapatsoulis, N., et al., "Face Detection in Color Images and Video Sequences," 10th Mediterranean Electrotechnical Conference (MELECON), May 29-31, 2000; vol. 2; pp. 498-502.

Veratech Corp., "Phantom Sentinel," © VeratechAero 2006, 1 page; http://www.veratechcorp.com/phantom.html.

Vertegaal, Roel, et al., "GAZE-2: Conveying Eye Contact in Group Video Conferencing Using Eye-Controlled Camera Direction," CHI 2003, Apr. 5-10, 2003, Fort Lauderdale, FL; Copyright 2003 ACM 1-58113-630-7/03/0004; 8 pages; http://www.hml.queensu.ca/papers/vertegaalchi0403.pdf.

Wachs, J., et al., "A Real-time Hand Gesture System Based on Evolutionary Search," Vision, $3^{rd}$ Quarter 2006, vol. 22, No. 3, 18 pages; http://web.ics.purdue.edu/~jpwachs/papers/3q06vi.pdf.

Wang, Hualu, et al., "A Highly Efficient System for Automatic Face Region Detection inMPEG Video," IEEE Transactions on Circuits and Systems for Video Technology; vol. 7, Issue 4; 1977 pp. 615-628.

(56) References Cited

OTHER PUBLICATIONS

Wang, Robert and Jovan Popovic, "Bimanual rotation and scaling," video clip, YouTube, posted by rkeltset on Apr. 14, 2010, 1 page; http://www.youtube.com/watch?v=7TPFSCX79U.
Wang, Robert and Jovan Popovic, "Desktop virtual reality," video clip, YouTube, posted by rkeltset on Apr. 8, 2010, 1 page; http://www.youtube.com/watch?v=9rBtm62Lkfk.
Wang, Robert and Jovan Popovic, "Gestural user input," video clip, YouTube, posted by rkeltset on May 19, 2010, 1 page; http://www.youtube.com/watch?v=3JWYTtBjdTE.
Wang, Robert and Jovan Popovic, "Manipulating a virtual yoke," video clip, YouTube, posted by rkeltset on Jun. 8, 2010, 1 page; http://www.youtube.com/watch?v=UfgGOO2uM.
Wang, Robert and Jovan Popovic, "Real-Time Hand-Tracking with a Color Glove, ACM Transaction on Graphics," 4 pages, [Retrieved and printed on Dec. 1, 2010] http://people.csail.mit.edu/rywang/hand.
Wang, Robert and Jovan Popovic, "Real-Time Hand-Tracking with a Color Glove, ACM Transaction on Graphics" (SIGGRAPH 2009), 28(3), Aug. 2009; 8 pages http://people.csail.mit.edu/rywang/handtracking/s09-hand-tracking.pdf.
Wang, Robert and Jovan Popovic, "Tracking the 3D pose and configuration of the hand," video clip, YouTube, posted by rkeltset on Mar. 31, 2010, 1 page; http://www.youtube.com/watch?v=JOXwJkWP6Sw.
Weinstein et al., "Emerging Technologies for Teleconferencing and Telepresence," Wainhouse Research 2005 http://www.ivci.com/pdf/whitepaper-emerging-technologies-for-teleconferencing-and-telepresence.pdf.
Westerink, P.H., et al., "Two-pass MPEG-2 variable-bitrate encoding," IBM Journal of Research and Development, Jul. 1991, vol. 43, No. 4; http://citeseerx.ist.psu.edu/viewdoc/summary?doi=10.1.1.128.421; 18 pages.
Wiegand, T., et al., "Efficient mode selection for block-based motion compensated video coding," Proceedings, 2005 International Conference on Image Processing IIP 2005, pp. 2559-2562; citeseer.ist.psu.edu/wiegand95efficient.html.
Wiegand, T., et al., "Rate-distortion optimized mode selection for very low bit rate video coding and the emerging H.263 standard," IEEE Trans. Circuits Syst. Video Technol., Apr. 1996, vol. 6, No. 2, pp. 182-190.
Wi-Fi Protected Setup, from Wikipedia, Sep. 2, 2010, 3 pages http://en.wikipedia.org/wiki/Wi-Fi_Protected_Setup.
Wilson, Mark, "Dreamoc 3D Display Turns Any Phone Into Hologram Machine," Oct. 30, 2008; http://gizmodo.com/5070906/dreamoc-3d-display-turns-any-phone-into-hologram-machine; 2 pages.
WirelessDevNet, Melody Launches Bluetooth Over IP, [retrieved and printed on Jun. 5, 2010] http://www.wirelessdevnet.com/news/2001/155/news5.html; 2 pages.
Xia, F., et al., "Home Agent Initiated Flow Binding for Mobile IPv6," Network Working Group, Oct. 19, 2009, 15 pages; http://tools.ietf.orghtml/draft-xia-mext-ha-init-flow-binding-01.txt.
Xin, Jun, et al., "Efficient macroblock coding-mode decision for H.264/AVC video coding," Technical Repot MERL 2004-079, Mitsubishi Electric Research Laboratories, Jan. 2004; www.merl.com/publications/TR2004-079/; 12 pages.
Yang, Jie, et al., "A Real-Time Face Tracker," Proceedings 3rd IEEE Workshop on Applications of Computer Vision; 1996; Dec. 2-4, 1996; pp. 142-147; http://www.ri.cmu.edu/pub_files/pub1/yang_jie_1996_1/yang_jie_1996_1.pdf.
Yang, Ming-Hsuan, et al., "Detecting Faces in Images: A Survey," vol. 24, No. 1; Jan. 2002; pp. 34-58; http://vision.ai.uiuc.edu/mhyang/papers/pami02a.pdf.
Yang, Ruigang, et al., "Real-Time Consensus-Based Scene Reconstruction using Commodity Graphics Hardware," Department of Computer Science, University of North Carolina at Chapel Hill; 2002; http://www.cs.unc.edu/Research/stc/publications/yang_pacigra2002.pdf; 10 pages.
Yang, Xiaokang, et al., Rate Control for H.264 with Two-Step Quantization Parameter Determination but Single-Pass Encoding, EURASIP Journal on Applied Signal Processing, Jun. 2006; http://downloads.hindawi.com/journals/asp/2006/063409.pdf; 13 pages.
Yegani, P. et al., "GRE Key Extension for Mobile IPv4," Network Working Group, Feb. 2006, 11 pages; http://tools.ietf.org/pdf/draft-yegani-gre-key-extension-01.pdf.
Yoo, Byounghun, et al., "Image-Based Modeling of Urban Buildings Using Aerial Photographs and Digital Maps," Transactions in GIS, 2006, 10(3): p. 377-394.
Zhong, Ren, et al., "Integration of Mobile IP and MPLS," Network Working Group, Jul. 2000, 15 pages; http://tools.ietf.org/html/draft-zhong-mobile-ip-mpls-01.
PRC Aug. 3, 2012 SIPO First Office Action from Chinese Application No. 200980119121.5; 16 pages.
PRC Dec. 18, 2012 Response to SIPO First Office Action from Chinese Application No. 200980119121.5; 16 pages.
PRC Jan. 7, 2012 SIPO Second Office Action from Chinese Application Serial No. 200980105262.1.
PRC Apr. 3, 2013 SIPO Second Office Action from Chinese Application No. 200980119121.5; 16 pages.
PRC May 17, 2013 Response to SIPO Second Office Action from Chinese Application No. 200980119121.5; 16 pages.
"Oblong Industries is the developer of the g-speak spatial operation environment," Oblong Industries Information Page, 2 pages, [Retrieved and printed on Dec. 1, 2010] http://oblong.com.
Underkoffler, John, "G-Speak Overview 1828121108," video clip, Vimeo.com, 1 page, [Retrieved and printed on Dec. 1, 2010] http://vimeo.com/2229299.
Kramer, Kwindla, "Mary Ann de Lares Norris at Thinking Digital," Oblong Industries, Inc. Web Log, Aug. 24, 2010; 1 page; http://oblong.com/articles/OBS6hEeJmoHoCwgJ.html.
"Mary Ann de Lares Norris," video clip, Thinking Digital 2010 Day Two, Thinking Digital Videos, May 27, 2010, 3 pages; http://videos.thinkingdigital.co.uk/2010/05/mary-ann-de-lares-norris-oblong/.
Kramer, Kwindla, "Oblong at TED," Oblong Industries, Inc. Web Log, Jun. 6, 2010, 1 page; http://oblong.com/article/OB22LFIS1NVyrOmR.html.
Video on TED.com, Pranav Mistry: the Thrilling Potential of SixthSense Technology (5 pages) and Interactive Transcript (5 pages), retrieved and printed on Nov. 30, 2010; http://www.ted.com/talks/pranav_mistry_the_thrilling_potential_of_sixthsense_technology.html.
"John Underkoffler points to the future of UI," video clip and interactive transcript, Video on TED.com, Jun. 2010, 6 pages; http://www.ted.com/talks/john_underkoffler_drive_3d_data_with_a_gesture.html.
Kramer, Kwindla, "Oblong on Bloomberg TV," Oblong Industries, Inc. Web Log, Jan. 28, 2010, 1 page; http://oblong.com/article/0AN_1KD9q990PEnw.html.
Kramer, Kwindla, "g-speak at RISD, Fall 2009," Oblong Industries, Inc. Web Log, Oct. 29, 2009, 1 page; http://oblong.com/article/09uW060q6xRIZYvm.html.
Kramer, Kwindla, "g-speak+TMG," Oblong Industries, Inc. Web Log, Mar. 24, 2009, 1 page; http://oblong.com/article/08mM77zpYMm7kFtv.html.
"g-stalt version 1," video clip, YouTube.com, posted by zigg1es on Mar. 15, 2009, 1 page; http://youtube.com/watch?v=k8ZAqI4mdvk.
Underkoffler, John, "Carlton Sparrell speaks at MIT," Oblong Industries, Inc. Web Log, Oct. 30, 2009, 1 page; http://oblong.com/article/09usAB4I1Ukb6CPw.html.
Underkoffler, John, "Carlton Sparrell at MIT Media Lab," video clip, Vimeo.com, 1 page, [Retrieved and printed Dec. 1, 2010] http://vimeo.com/7355992.
Underkoffler, John, "Oblong at Altitude: Sundance 2009," Oblong Industries, Inc. Web Log, Jan. 20, 2009, 1 page; http://oblong.com/article/08Sr62ron_2akg0D.html.
Underkoffler, John, "Oblong's tamper system 1801011309," video clip, Vimeo.com, 1 page, [Retrieved and printed Dec. 1, 2010] http://vimeo.com/2821182.
Feld, Brad, "Science Fact," Oblong Industries, Inc. Web Log, Nov. 13, 2008, 2 pages, http://oblong.com/article/084H-PKI5Tb9I4Ti.html.

(56) References Cited

OTHER PUBLICATIONS

Kwindla Kramer, "g-speak in slices," Oblong Industries, Inc. Web Log, Nov. 13, 2008, 6 pages; http://oblong.com/article/0866JqfNrFg1NeuK.html.

Underkoffler, John, "Origins: arriving here," Oblong Industries, Inc. Web Log, Nov. 13, 2008, 5 pages; http://oblong.com/article/085zBpRSY9JeLv2z.html.

Rishel, Christian, "Commercial overview: Platform and Products," Oblong Industries, Inc., Nov. 13, 2008, 3 pages; http://oblong.com/article/086E19gPvDcktA19.html.

PRC Jul. 9, 2013 SIPO Third Office Action from Chinese Application No. 200980119121.5; 15 pages.

PRC Sep. 24, 2013 Response to SIPO Third Office Action from Chinese Application No. 200980119121.5; 5 pages.

* cited by examiner

SYSTEM AND METHOD FOR PROVISIONING FLOWS IN A MOBILE NETWORK ENVIRONMENT

TECHNICAL FIELD

This disclosure relates in general to the field of communications and, more particularly, to provisioning flows in a mobile network environment.

BACKGROUND

In certain Internet protocol environments, flows from a mobile node may be carried over tunnels between network elements (e.g., between a mobility access gateway and a local mobility anchor). There are various networking considerations when trying to manage these flows. For example, data rate and quality of service (QoS) issues should be addressed for each of these flows. Certain traffic flows may need bandwidth guarantees (e.g., to minimize delay, jitter etc.): while other flows may need to be carried over a common tunnel with additional traffic flows that deserve best effort routing. As a general proposition, managing packet flows, without sacrificing performance, presents a significant challenge to service providers, network operators, and system designers alike.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

A method is provided in one example embodiment and includes receiving a request from a mobile node for an Internet protocol (IP) address and establishing a point-to-point (PPP) link for the mobile node. The method also includes provisioning a first tunnel associated with a first communication flow for the mobile node, and provisioning a sub-tunnel with the first tunnel for a second communication flow. The second communication flow is associated with a high priority type of data to be transported on the sub-tunnel. In more specific embodiments, a call admission control (CAC) mechanism is used to establish the sub-tunnel with the first tunnel for the second communication flow. Additionally, an inner label is installed in a header of a packet associated with the second communication flow in order to identify the sub-tunnel.

In yet other embodiments, network traffic is evaluated to determine if it is associated with voice data or video data to be classified as the high priority type of data. A traffic flow template (TFT) and a packet filter can be provisioned for the first communication flow in conjunction with the mobile node roaming into a network. An entry in a database is provisioned for the first communication flow, and the entry includes a care of address (CoA) through which the mobile node is reachable. An advertisement message is sent to the mobile node to indicate a home address (HoA) associated with the mobile node. A packet exchange can indicate that a CoA is to be associated with the HoA.

Example Embodiments

Figure 1:
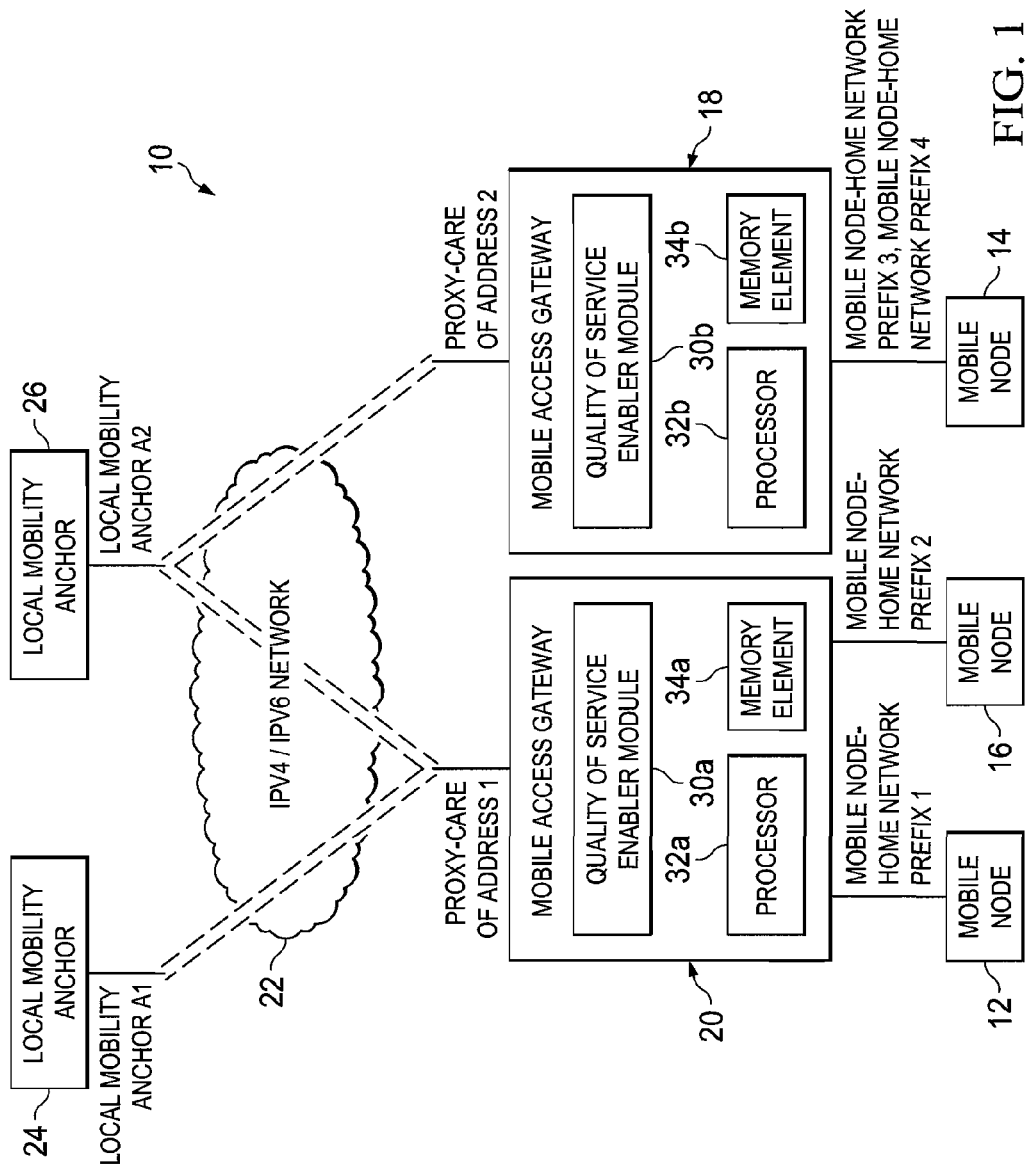
FIG. 1 is a simplified block diagram illustrating a communication system for providing management of bidirectional guaranteed-bandwidth (GB) traffic-engineered (TE) tunnels in a network environment in accordance with one embodiment of the present disclosure.

Turning to FIG. 1, FIG. 1 is a simplified block diagram of a communication system 10 for managing flows and/or tunnels in a network environment in accordance with one embodiment of the present disclosure. In a particular example, communication system 10 can be configured for appropriately coordinating guaranteed-bandwidth (GB) traffic-engineered (TE) tunnels. FIG. 1 includes a set of local mobility anchors (LMAs) 24, 26 coupled through tunnels to a network 22, which can employ an Internet protocol (IP) version 4 (IPv4)/IP version 6 (IPv6) paradigm. Additionally, LMAs 24, 26 can use a proxy care of address (CoA) 1 and a proxy care of address 2 for interfacing with a mobile access gateway (MAG) 20 and a MAG 18 respectively. MAGs 18, 20 can be provisioned with a respective quality of service enabler (QoSE) module 30*a-b*, a processor 32*a-b*, and a memory element 34*a-b*. QoSE modules 30*a-b* can also include suitable interfaces for receiving and/or transmitting data. QoSE modules 30*a-b* can readily interact with each other or other elements and devices of communication system 10 in order to exchange traffic commands, signaling, etc.

MAG 20 can provide connectivity to a mobile node 12 through a home network prefix 1 and similarly provide connectivity to a mobile node 16 through a home network prefix 2. MAG 18 can provide connectivity to a mobile node 14 though either a home network prefix 3 or a home network prefix 4. Communication system 10 may include a configuration capable of transmission control protocol/internet protocol (TCP/IP) communications for the transmission and/or reception of packets in a network. Communication system 10 may also operate in conjunction with a user datagram protocol/IP (UDP/IP) or any other suitable protocol, where appropriate and based on particular needs.

For purposes of illustrating certain example techniques of communication system 10, it is important to understand the communications that may be traversing the network. The following foundational information may be viewed as a basis from which the present disclosure may be properly explained. Multiprotocol label switching (MPLS) is a technology derived from tag switching that uses the label-swapping paradigm in forwarding packets. A label switch path (LSP) can be used in conjunction with a label swapping operation for packets to be forwarded. Service providers can use traffic engineering on MPLS-enabled routers to route a customer's network traffic based on throughput and delay. TE tunnels are created for label switch paths (LSPs) using a Resource Reservation Protocol (RSVP). A tunnel interface represents the head of the LSP, and this can be configured with a set of resource requirements (e.g., bandwidth requirements, media requirements, and priority). In certain scenarios, network 22 can be configured to respect the terms of service (TOS)/differentiated services code point (DSCP) values on the outer IP header in a proxy mobile Internet protocol version 6 (PMIPv6) tunnel. In such an instance, quality of service for the more important flows in the network can be managed.

However, in the presence of video and voice, TE tunnels established with a call admission control (CAC)-based mechanism may be required to aggregate video and voice traffic over these tunnels. This ensures a quality of service without having to share the bandwidth (on the path between the MAG and the LMA) with other best effort (or less important) traffic. TE tunnels that are based on MPLS could be used for this purpose. TE-based tunnels can effectively carry aggregate voice and video traffic through a set of links, which are engineered to carry high volume traffic. This set of links may be a part of the transport network that is overprovisioned for this exact purpose. Additionally, protection tunnels may be required for these video/voice flows.

Scenarios that involve various paths being interleaved with paths capable of carrying best effort traffic can be particularly challenging. For example, if hard guarantees are required and, further, if bandwidth resources are over-provisioned, certain types of traffic should be mapped. The traffic can flow to (and from) a mobile node and onto these guaranteed tunnels (e.g., having protection switching enabled).

A PMIPv6 environment can be provisioned for the $3^{rd}$-Generation partnership project (3GPP2) for code division multiple access (CDMA)-based mobile nodes. Flows from a mobile node may be carried over PMIPv6 tunnels between a packet data serving node (PDSN) (e.g., acting as the MAG), and a home agent (HA) (e.g., acting as the LMA). These activities are commonly performed without considering a bifurcation of traffic flows. The bifurcation can depend on quality of service (QoS) required for each traffic flow over a common tunnel between the MAG and the LMA. These traffic flows should include bandwidth guarantees to account for delay, jitter, etc., and the flows would be carried over a common MAG-LMA TE tunnel in conjunction with traffic flows that deserve best effort. In certain alternative technologies, the network between the MAG and the LMA can be configured to respect the TOS/DSCP values on the outer IP header in a PMIPv6 tunnel. In other alternative technologies, MPLS can be used to carry an aggregate of voice and video traffic through a set of links that are engineered to carry high-volume traffic. Such a set of links may be a part of the transport network that is overprovisioned for this purpose.

In still yet other architectures, an assumption can be made that the network between the MAG and the LMA is an IPv4 or an IPv6 network. Although MPLS-enabled networks may have been employed, MPLS with TE can be deployed to ensure optimal utilization of nodes and links. However, in these architectures, assuming QoS even exists, it may be based on DSCP marking for expedited forwarding (EF) traffic (such as voice/video traffic). In cases where the same EF traffic grows beyond a certain volume, EF flows may start dropping packets, which may impact the quality of service of such flows: even in cases where these flows are marked as high priority.

Furthermore, existing bi-directional tunnels based on IP-in-IP tunneling (v4/v6 etc.) do not offer the specific QoS required of critical traffic and other voice/video traffic that requires certain hard guarantees when compared with web traffic. DSCP marking does not adequately function as a granular networking model. For example, strict QoS is not applied upstream toward a PDSN from the mobile node. Instead, DSCP remarking may be employed and this fails to offer a strict QoS. Downstream to the mobile node, only aggregate policing elements (i.e., 'policers') are applied, which results in a lack of guarantees on the MAG/LMA leg of the traffic path.

Communication system 10 can address the aforementioned issues (and others) to ensure mobile node flows are carried over appropriately sized guaranteed bandwidth TE tunnels in a proxy mobile IPv6 environment. Network traffic having hard guarantees can be carried atop tunnels, which can satisfy the hard guarantee provisioning. In specific implementations, communication system 10 can be configured to provide a sub-flow/sub-channel management architecture. In certain examples, the architecture can offer a protocol to enable sub-flows in a mobile domain (e.g., a PMIPv6 domain), where the MAG and the LMA are capable of providing a mobile node with network-based mobility. Stated in different terms, different traffic sub-flows with different characteristics can be provisioned (i.e., derived, associated, linked, etc.) atop a tunnel. The tunnel could be an aggregate GB TE tunnel that exists between the MAG and the LMA. Generally, a TE tunnel refers to MPLS LSPs that are established using a MPLS-TE and a path algorithm (e.g., using a constrained shortest path first (CSPF) algorithm). The GB TE tunnel can carry the reserved bandwidth for these flows (or sub-flows, an aggregate of flows, etc.) for which the guarantees have been given.

The sub-flow or sub-tunnel can consume part of the bandwidth of the aggregate TE tunnel and, further, have a designated QoS for a specific sub-flow derived from the aggregate GB TE tunnel. [Note that the terms 'sub-flow' and 'sub-channel' may be used interchangeably herein.] The aggregate GB TE tunnel may include more than one sub-flow/sub-tunnel: each with its own QoS requirements, etc. Additionally, there may be more than one TE tunnel. Each sub-flow can consume a portion of the available guaranteed bandwidth of the GB TE tunnel. Generally, use of a two-level label stack (with the inner label indicating the sub-flow and the outer label signifying the guaranteed bandwidth) allows for better control of such network parameters (e.g., QoS, etc.).

In one embodiment, labeled packets can be carried (e.g., propagating to a correspondent node (CN) from a mobile node) on the Internet side of a home agent. Communication system 10 can also use MPLS labels for sub-flows for an instance of a network tunnel from the home agent (HA) to the foreign agent (FA) and, further, onto the layer two (L2) tunnels on the radio access network (RAN) side. Communication system 10 can also employ preferential treatment of flows in the intermediate network between the FA and the HA. Re-registration proxy binding updates (PBUs) and proxy binding acknowledgements (PBAs) having additional mobility options can be used for flow provisioning between the MAG and the LMA. MPLS-TE can be used to provide hard QoS guarantees for specific high priority sub-flows that require such guarantees.

Note that communication system 10 is also applicable to other mobility gateways and in other spheres such as global system for mobile communications (GSM), Worldwide Interoperability for Microwave Access (WiMAX), long term evolution (LTE), etc. Additionally, communication system 10 can be used in PDSN environments, as discussed in detail below. Communication system 10 can equally apply to mobile gateways and other environments where flow management is needed. For example, communication system 10 can be used in gateway GPRS support node (GGSN)/serving GPRS support node (SGSN) applications, broadband wireless group (BWG) arrangements, etc. For certain implementations of communication system 10, open shortest path first traffic engineering (OSPF-TE) or intermediate system to intermediate system traffic engineering (ISIS-TE) can be deployed within one or more administrative domains between the MAG and the LMA to facilitate MPLS-TE.

Additionally, the proffered architecture can provide explicit routing using RSVP-TE in order to setup the bandwidth guaranteed tunnels. The CSPF can be leveraged to determine the explicit path that, in turn, can use the TE extensions for OSPF/Intermediate System To Intermediate System (IS-IS) in the network. This allows for the diverting of certain types of traffic through certain paths, which would otherwise not be available in the OSPF/IS-IS versions incapable of supporting the TE extensions. Furthermore, communication system 10 can be configured to enable protection switching for priority traffic. The priority traffic can be node-disjointed or link-disjointed (or both) such that if a failure occurs, then a backup LSP can be chosen. This can readily be adopted within an existing MPLS framework, where fast reroute protocols would be available.

In a multiple service provider PMIPv6 domain, the framework of communication system 10 allows for inter-autonomous system (AS) tunnels to be quickly realized. It should also be noted that voice/video quality does not degrade as more users are added in the network. This could be particularly useful in the case of LTE. Furthermore, communication system 10 can be used in multicasting, where a multicast flow toward one or more BSNs can be guaranteed bandwidth in the downstream direction.

In operation, communication system 10 can employ a CAC-based mechanism to assist in permitting flows to be carried without dropping flows (or at least minimizing this dropping activity). The CAC-based mechanism admits flows both in the upstream and downstream directions on the TE tunnels. In certain scenarios, this can be achieved by CAC-ing the flows against the aggregate bandwidth of the provider for that particular mobile node. Indirectly, the flow trends being calculated can assist in provisioning additional links and routers depending on the customer demand for such services.

In certain embodiments, the activities of communication system 10 do not affect typical encapsulations of a PMIPv6 domain. The existing encapsulations can be supported 'as is' with the addition of an outer MPLS shim header between the Layer 2 and Layer 3 headers, where the MPLS header contains a two-level label stack. Instead, the inner label is inspected and the forwarding entries are evaluated. An additional step in this process is to validate the CoA/HA address combination in the outer header. In other embodiments, communication system 10 also employs a Mobile Transport over IP (MToP) approach in an IP RAN solution. MToP refers to the conversion of existing radio elements of the RAN to IP routing/switching elements. The MToP solution addresses the RAN-to-PDSN leg, whereas the PMIP solution addresses the MAG-to-LMA (and vice-versa) leg. An MToP approach can include an L2 or an L3 solution for backhauling to the aggregation edge using MPLS.

In one embodiment, the TE tunnels can also be built on the fly after bandwidth exhaustion in the existing default tunnel, or the existing provisioned TE tunnels, as necessary. The architecture can employ MPLS as the underlying technology to carry the traffic to and from the mobile node based on traffic parameters, and this avoids having multiple proxy-CoA and multiple LMA addresses. LMA 24 is reachable from MAG 20 through multiple TE tunnels: each of them having a distinct outer label in the MPLS header stack to distinguish one from the other. The tunnels between LMA 24 and MAG 20 can be spliced with the PPP tunnel that has QoS guaranteed for flows toward the mobile node. This can be accomplished with an aggregate value downloaded from the AAA server. For example, when the aggregate TE-LSPs configured between the given MAG and the LMA exhaust the allocated bandwidth, traffic for the new flows would flow through the default tunnel.

In the process of assigning sub-flows, communication system 10 can effectively deduce the flows that are voice and/or video. Note that in certain systems, voice calls that are carried over IP may be set up through mechanisms such as SKYPE, FRING, etc. that employ alternatives through which VoIP calls can be established. This results in an exchange of signaling information between endpoints, which can result in a setup of a data path using protocols such as real-time protocol (RTP), real-time streaming protocol (RTSP), etc. Video from applications such as FRING, SKYPE, YouTube, etc. stream data downstream to a mobile node. There are common characteristics in voice/video flows that can help to achieve a proper deduction algorithm.

In one embodiment, communication system 10 can re-use re-registration PBUs and PBAs with additive mobility options to be used for the purpose of flow provisioning between the MAG and the LMA. Communication system 10 can use MPLS-TE in conjunction with these mobility options to provide QoS guarantees for specific high priority flows that require such guarantees. In an alternative embodiment, communication system 10 advantageously employs MPLS-TE with CSPF (e.g., on a path computation element (PCE)) for MAG and LMA TE tunnels with flow provisioning performed by re-registration PBUs.

In one embodiment, communication system 10 can employ the aggregate policers per mobile node configured on a processing card level for downstream resources (e.g., DSCP marking in the upstream direction) to keep the throughput under acceptable limits. High priority data can flow within the confines of the aggregate policers in the downstream, and the DSCP marking in the upstream can be CAC-ed onto TE-LSP tunnels for guaranteed QoS.

In practical terms, applications such as www.youtube.com are typically sent by unicast (rather than using multicast). A number of mobile nodes that are actively requesting unicast streams of YouTube may cause congestion in the network: without specific provisioning of bandwidth through CAC-based mechanisms on TE tunnels. Communication system 10 can effectively address these unicast scenarios in order to avoid such congestion. If the CAC fails on the existing TE tunnels, then the traffic can be sent as a last resort on existing non-TE-LSPs. These can reside in the intervening network between the MAG and the LMA and, further, be built by the Label Distribution Protocol (LDP), or through the default tunnel that exists between the MAG and the LMA (IP-in-IP/generic routing encapsulation (GRE)).

In regards to semantics, MPLS specific extensions are available within the context of provider networks. In example embodiments, communication system 10 can be deployed with appropriate changes to the MAG and the LMA. In other scenarios, an MToP paradigm can be stitched to the configuration of communication system 10 to provide an all-IP solution that extends from the RAN edge to the Internet. Internet TE-LSPs constructed by providers with agreements between each other (e.g., Tier 1 ISP, Tier 2 ISP, etc.) can be stitched together with an LMA on one end, and the CNs on the Internet (i.e., aggregated by the provider) on the other end.

Note that in certain example scenarios discussed herein, reference to resource reservation protocol (RSVP) refers to RSVP-TE mechanisms to establish bi-directional LSPs in MPLS-based networks. This can further include downstream explicit route objects (EROS) and upstream EROS, as specified in a generalized multiprotocol label switching protocol (GMPLS). This can also include upstream traffic specification and downstream traffic specification that outlines the traffic characteristics of the aggregate flows to be carried atop provisioned tunnels.

Figure 2:
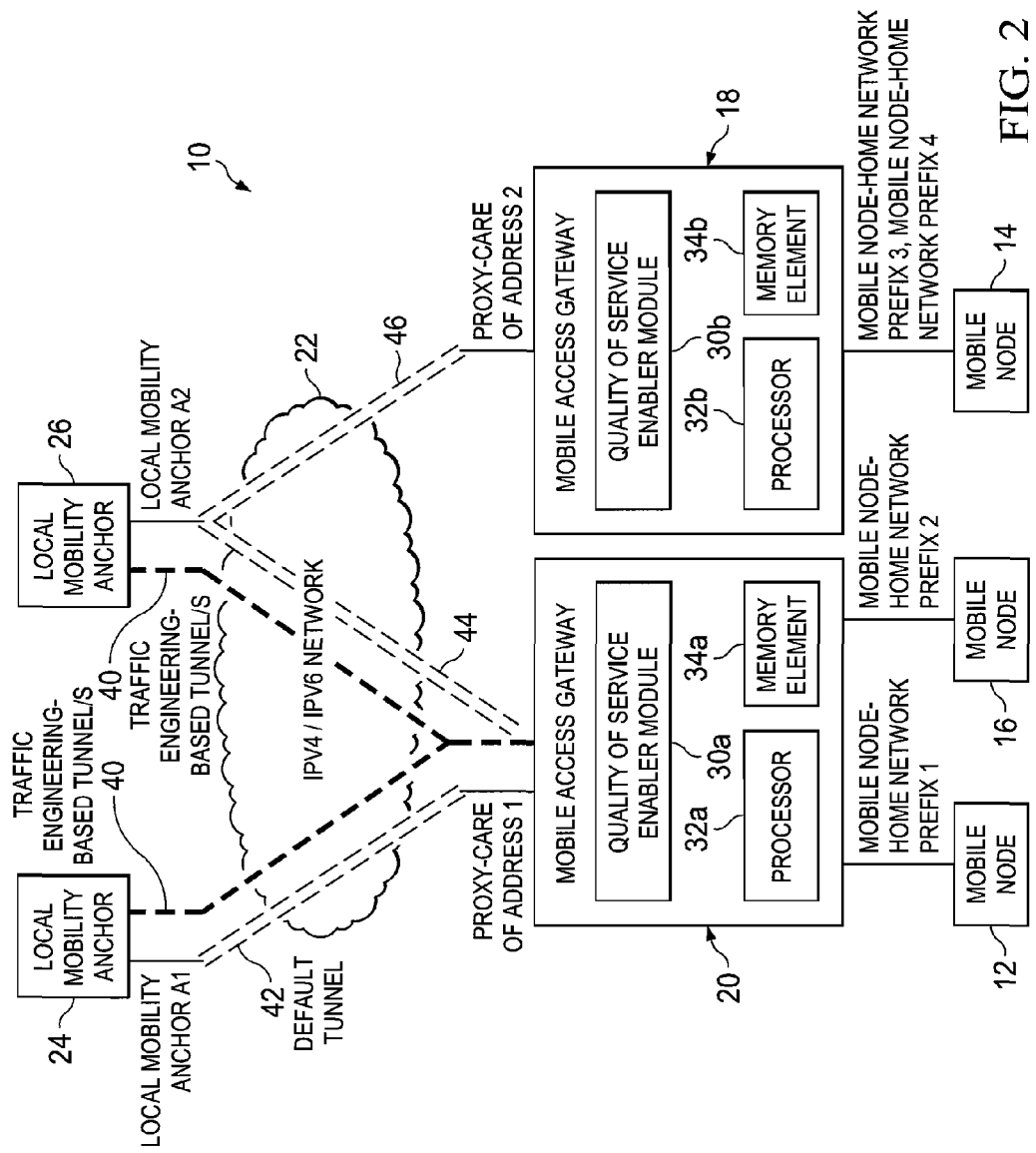
FIG. 2 is a simplified block diagram illustrating additional details related to an example infrastructure of the communication system in accordance with one embodiment of the present disclosure.

Before turning to some of the example operations of this architecture, a brief discussion is provided about some of the infrastructure of FIGS. 1-2. The term 'mobile node' is inclusive of devices used to initiate a communication such as a computer, a personal digital assistant (PDA), a laptop or electronic notebook, a Webcam, a wireless access point, a residential gateway, a modem, a cellular telephone, an iPhone, an IP phone, a digital video recorder, a camera, or any other device, component, element, or object capable of initiating or facilitating voice, audio, video, media, or data exchanges within communication system 10. Mobile nodes 12, 14, 16 may also be inclusive of a suitable interface to the human user, such as a microphone, a display, or a keyboard or other terminal equipment. Mobile nodes 12, 14, 16 may also be any device that seeks to initiate a communication on behalf of another entity or element, such as a program, a database, or any other component, device, element, or object capable of initiating an exchange within communication system 10.

LMA 24, 26, MAG 18, 20, and any PDSN (e.g., a serving or source PDSN [SPDSN], a target PDSN [TPDSN], etc. that are discussed below with reference to FIGS. 6A-13) are network elements that can coordinate their activities in order to achieve the appropriate flow provisioning (e.g., for QoS, for handoff, etc.) as outlined herein in this Specification. As used herein in this Specification, the term 'network element' is meant to encompass routers, switches, gateways, bridges, loadbalancers, firewalls, applications, application program interfaces (APIs), inline service nodes, proxies, servers, processors, modules, or any other suitable device, component, element, or object operable to exchange information in a network environment. This network element may include any suitable hardware, software, components, modules, interfaces, or objects that facilitate the operations thereof. This may be inclusive of appropriate algorithms and communication protocols that allow for the effective exchange (reception and/or transmission) of data or information. QoSE modules 30a-b can be provisioned in network elements (e.g., MAG 18, 20, TPDSN, SPDSN) that manage (or that cooperate with each other and other network balances in order to manage) TE-traffic sub-flows that are atop of (or that are derived from) aggregate GB TE tunnels.

Network 22 represents a series of points or nodes of interconnected communication paths for receiving and transmitting packets of information that propagate through communication system 10. Network 22 offers a communicative interface between network elements, devices, etc. and may be any local area network (LAN), wireless LAN (WLAN), metropolitan area network (MAN), wide area network (WAN), extranet, Intranet, VPN, or any other appropriate architecture or system that facilitates data propagation in a network environment. Network 22 can foster various types of communications and, further, can be replaced by any suitable network components for facilitating the propagation of data between participants, endpoints, and/or mobile nodes in a network environment.

Note that for cooperating mobile nodes 12, 14, 16, MAGs 18, 20, and the TPDSN, the SPDSN can manage and coordinate certain processing operations. Using a similar rationale, their respective memory elements may store, maintain, and/or update data in any number of possible manners. Additionally, because some of these network elements can be readily combined into a single unit, device, or server (or certain aspects of these elements can be provided within each other), some of the illustrated processors may be removed, or otherwise consolidated such that a single processor and/or a single memory location could be responsible for certain activities associated with flow management controls. In a general sense, the arrangement depicted in FIGS. 1-2 (and in subsequent FIGURES) may be more logical in its representations, whereas a physical architecture may include various permutations/combinations/hybrids of these elements.

In one example implementation, mobile nodes 12, 14, 16, MAG 18, 20, and/or the TPDSN and the SPDSN include software (where these functions can be consolidated in any fashion) to achieve the flow management operations described herein. QoSE modules 30a-30b may be provisioned within MAG 20, LMA 24, the TPDSN, and/or the SPDSN. In other embodiments, this functionality may be provided externally to any of the aforementioned elements, or included in some other network element to achieve this intended functionality. Alternatively, several elements may include software (or reciprocating software) that can coordinate in order to achieve the operations, as outlined herein. In still other embodiments, any of the devices of the illustrated FIGURES may include any suitable algorithms, hardware, software, components, modules, interfaces, or objects that facilitate these sub-flow management operations. Details relating to the possible signaling and interactions between the components of communication system 10 are provided below with reference to FIGS. 3-13.

Turning to FIG. 2, FIG. 2 is a simplified block diagram of communication system 10 illustrating details associated with tunnel provisioning. FIG. 2 includes a plurality of TE bidirectional tunnels 40, which comprise sub-flows of various parameters that can be provisioned in conjunction with GB TE-based tunnels. Embodiments employing these GB TE tunnels can be provisioned while considering the totality of the sub-tunnels between a given MAG and a given LMA (as one single aggregate link). Each MPLS-TE tunnel can be a sub-tunnel identified by its tunnel ID. FIG. 2 further includes a set of default tunnels 42, 44, and 46, which can be used for traffic that overflows from the GB TE bidirectional tunnels. Note that the traffic specification (TSPEC) may be used when GB TE tunnels are established.

In operational terms, the MAG and the LMA can perform the function of a foreign agent and a home agent in the MIP framework. In the PMIPv6 case, a GB TE bi-directional tunnel transports data packets to and from mobile nodes between MAGs and LMAs using various possible encapsulations. In the example of FIG. 2, communication system 10 can construct one or more appropriate bandwidth-provisioned MPLS-TE tunnels between MAG 20, 18 and LMA 24, 26. Each TE-based tunnel can have one or more sub-flows provisioned thereon. The architecture can ensure that high priority Internet packet flows (e.g., voice and video) are transported on sub-TE tunnels that are CAC-ed onto these aggregate TE tunnels.

In operation, a number of steps can be initiated to enable provisioning of sub-flows. First, mobile node 12 contacts MAG 20, which can interface with an authorization, authentication, and accounting management (AAA) server for LMA information. The AAA server can then return LMA 24 address (e.g., the home agent address), along with a security parameter index (SPI) key for a security association to MAG 20. Subsequently, MAG 20 can contact LMA 24 with a PBU/PBA exchange to receive a home network prefix (HNP). The HNP can be registered with the proxy care of address (CoA). The HNP prefix is effectively tied to a proxy CoA address on MAG 20, where a binding entry can be created for this purpose at LMA 24 (or in any other suitable memory element location).

At a next step, an IPv6 control protocol (CP) exchange occurs to bring up a PPP link between MAG 20 and mobile node 12. A network advertisement message, such as a router advertisement message, can then be sent to mobile node 12 from MAG 20: indicating the Home Address (HoA) of mobile node 12. Regarding the first step discussed above, the PBU/PBA exchange generally indicates that the CoA for mobile node 12 is to be tied to its HoA as a binding entry at LMA 24. The CoA for mobile node 12 can be the MAG tunnel endpoint for that PMIPv6 tunnel, which can carry traffic back and forth from mobile node 12. From a logistics perspective, the LMA tunnel endpoint is the tunnel interface on LMA 24 through which the specified CoA is reachable.

Once this binding has been achieved, network traffic can flow. A traffic flow template (TFT) and packet filters for the various flows can be installed on MAG 20 (e.g., in QoSE module 30a). After flows are received at MAG 20, they can be tied to their respective packet filters, and appropriate actions (e.g., accounting, policing etc.) can be taken. The overall observed traffic can be determined (e.g., by QoSE module 30a) to be voice and/or video. This can be surmised by inspecting individual flow rates and/or respective packet filters, etc. The flows being observed can be checked for support against any downstream policer specifications, which can be installed on the PDSN/MAG. In certain embodiments, a subnet address is not used to associate each TE tunnel with an endpoint address.

Checks can be made for each flow being observed. If the aggregate flow bandwidth of all flows 'F' from that mobile node 12 is greater than the aggregate policer configured for mobile node 12 in the downstream direction, then the flows are not considered for the processing activities discussed below. Flows 'M' can be defined as follows: 'M'=F−(flows added last, which violate the aggregate policer per mobile node). These flows M can continue to flow on the default tunnel. Flows 'K' can be defined as follows: K=F−M (which were added in early first-come-first-served order). These activities can apply to high priority flows (e.g., voice and video), and not necessarily to best effort traffic, which can ride on the default bandwidth tunnel, along with other best effort traffic. In one embodiment, mobile node 12 can add a priority annotation to the packet filters that can help MAG 20 to decide which flows are to be included in the set K.

For a flow that does violate the above constraint, an entry can be made in a database with the following information for each of the K flows: 1) mobile node flow→Destination IP, Source IP, Destination Port, Source Port; 2) CoA through which the mobile node is reachable from the rest of the network (i.e., the proxy-CoA); and 3) an inner label value that uniquely indexes into an array of tunnel interfaces for that MAG/LMA combination. The combination can point to the MPLS sub-tunnels within the TE tunnels: between the specified MAG/LMA pair. The pair can be provisioned using RSVP with the assistance of a Traffic Engineering Database (TED), which could be stored in MAG 20. Each of these sub-flows can have a CAC-based admission scheme that help permit (or that deny) flows with specific traffic parameters to be carried over them.

In certain configurations of communication system 10, an array of GB TE tunnels exists for each LMA/MAG combination. For example, if there are three LMAs within a given PMIPv6 domain, then each MAG of the domain maintains an array of TE tunnels for each LMA. The TE tunnel construction can be initiated and managed by MAG 20. The TE tunnels can be constructed a-priori, or whenever more bandwidth is provisioned in the network. Particular sub-flows (having explicit QoS and other attributes) can be reserved and derived from these tunnels. The TE tunnels can be constructed using a PCE: possibly co-located within MAG 20. This can be performed in conjunction with a CSPF algorithm that considers the appropriate links based on the bandwidth, delay, etc. and other parameters associated with the topology. The PCE is an element that identifies the best path in terms of required bandwidth, delay etc. in a TE environment that deploys MPLS.

The TE tunnels are constructed using the RSVP-TE protocol after the CSPF decides which are the explicit routers and link descriptions chosen by the PCE. QoSE module 30a can employ traffic parameters for the allowed flow, which indicates aspects such as bandwidth, delay, and jitter characteristics for both upstream and downstream directions. These can include the upstream traffic specification from MAG 20 to LMA 24 for an aggregated pre-provisioned GB TE tunnel that may be shared by multiple sub-flows in the upstream traffic direction. These can be deduced from the upstream/reverse packet filters.

These aspects can also include the downstream traffic specification from LMA 24 to MAG 20 for an aggregated pre-provisioned TE tunnel, which may be shared by multiple sub-flows in the downstream direction toward mobile node 12. These can similarly be deduced from the downstream/forward packet filters. The downstream packet specification information derived from the forward packet filter is sent by MAG 20 to LMA 24. Hence, the actual packet filters are not necessarily transmitted to LMA 24 in certain embodiments.

In one embodiment, in order to retrieve the inner label value for an individual sub-flow derived from the aggregate GB TE-based tunnel to be installed, the following sub-steps are employed. Traffic parameters are applied to gain admittance (e.g., using CAC) into one instance of a given array of multiple TE tunnels. This could be accomplished using a round robin approach in certain embodiments. For example, if the first indexed GB TE tunnel is unable to provide the capacity to carry the traffic, the algorithm can move to the next under-occupied TE tunnel. MAG 20 can use the upstream resources from the mobile Upstream Traffic Parameters (UTPs) to obtain permission using CAC to bundle the flow in a chosen TE tunnel having capacity to carry the flow. Downstream Traffic Parameters (DTPs) can be gleaned from the Downstream Traffic Specification from the LMA to the MAG for an aggregated pre-provisioned TE tunnel. UTPs are provisioned in a similar fashion: reflecting the inverse of the DTPs.

Once CAC has been applied, and once one of the TE tunnels has an ability to carry the traffic of the flow per its traffic parameters, then a label value (L1) is assigned to the forwarding database element. L1 is typically an integer value that fits within a specified range. Subsequently, the information recorded in the MAG forwarding database is sent using a mobility option as a PBU re-registration. In one embodiment, the receiving LMA can ignore this option if it does not recognize the option and, further, can consider the rest of the message as a re-registration request. However, if the LMA understands this message format and the option provided in it, it can install the entry into its forwarding table.

In such a case, the inner label previously sent in the mobility option by the MAG introduces a reception label, which the LMA expects in traffic from that flow identifier (FID) forwarded to it in the upstream direction. The reception label can identify the sub-flow. Typically, an ordering of the tunnels on the MAG and the LMA within the array is the same for that MAG/LMA pair. The LMA also allocates an internal label (L2) for a downstream direction (e.g., performing its own CAC steps). In the case of LMA, DTP can be used to obtain permission to carry the flow atop the TE tunnel, which has the capacity to carry that traffic for the flow. Once that flow is carried atop the TE tunnel having the capacity, it is designated a sub-flow tunnel, as it may have characteristics that are different or more stringent from the flow from which it is derived.

The forwarding database on LMA 24 can be installed with the following entries: 1) Flow indicator→Destination IP, Source IP, Destination Port, Source port (role reversed information); 2) inner label (L2)→points to the GB TE tunnel through which the sub-flow is to be forwarded to the CoA; 3) CoA→proxy-CoA of MAG 20; and 4) Reception Label (L1)→inner label sent by MAG 20 in re-registration PBU, and which is to be used in the traffic sent to LMA 24 on the chosen TE tunnel. In one embodiment, tunnel information can point to the outer label to be imposed, and to the next hop information. This can also be used with sub-flows. LMA 24 can send the respective information to MAG 20 in a re-registration PBA, and MAG 20 can then install it in its forwarding database.

The forwarding database (at this stage, after receiving the PBA from the LMA) can include: 1) a flow indicator→Destination IP, Source IP, Destination port, Source port (role reversed information), where this indicates the given sub-flow, and is typically embodied in an outer label; 2) an inner label (L1)→points to the tunnel through which the sub-flow is to be forwarded to the LMA; 3) LMA→Address of LMA 24; and 4) Reception Label (L2)→inner label sent by LMA in re-registration PBA, which indicates the selected sub-flow.

In certain embodiments of communication system 10, there is a stage where provisioning of the TE-based tunnels is done by default. This can be done at the initial setup of the network, where this configuration can be done on an on-going basis, as the provisioning of additional high speed links is done across the topology. It can also be assumed that there is more than one service provider involved and, as such, this would dictate that inter-autonomous system (AS) TE tunnels could be established. In the case of a GRE key-based mechanism, the GRE key could map to another integer that would act as the inner label. The label would be indexed to a list of CAC-based TE tunnels, which are set up using RSVP as the label distribution mechanism.

In operation of an example scenario, mobile node 12 registers with an HoA of 1.1.1.1. Mobile node 12 has a flow associated with a corresponding node having an IP address of 2.2.2.2. Its flow coincides with a packet filter that requires a voice call guarantee of 64 kbps. The AAA server can direct mobile node 12 to LMA 24 with the address 1.1.1.12. Furthermore, three TE tunnels exist between MAG 20 and LMA 24 in this scenario.

The MAG database can have the following details:
 a. Flow id→1.1.1.1, 2.2.2.2, 1056, 1718;
 b. CoA→3.3.3.3;
 c. valid src/dst on the outer header→3.3.3.3, 1.1.1.12;
 d. innerLabel→2 for that flow tunnel for that MAG/LMA pair;
 e. upstream Traffic parameters→64 kbps, 250 msec delay, no jitter; and
 f. downstream Traffic parameters→64 kbps, 250 msec delay, no jitter.

After MAG 20 has sent the PBU with the required mobility option containing the above details, LMA 24 sends its acknowledgement with the following details:
 a. Flow id→2.2.2.2, 1.1.1.1, 1056, 1718;
 b. LMA address→1.1.1.12;
 c. Valid src/dst on the outer header→1.1.1.12, 3.3.3.3;
 d. innerLabel→3 for that tunnel for that MAG/LMA pair; and
 e. Upstream and downstream Traffic parameters→64 kbps, 250 msec delay, no jitter.

LMA 24 then performs the same procedure as MAG 20 from its directional point of view (downstream towards the mobile node), and sends an acknowledgement PBA back to MAG 20. Once this is complete, the forwarding databases are populated with the respective information, and then traffic is permitted to flow.

After this step, the forwarding tables on the MAG could be provided as follows:
 a. FID→XX→(description) 1.1.1.1, 2.2.2.2, 1056, 1718— this indicates the given sub-flow, and is typically an outer label;
 b. LMA→1.1.1.12 (next hop through tunnel);
 c. Valid src/dst on the outer header→3.3.3.3, 1.1.1.12;
 d. innerLabel→2→(points to) TE-based tunnel information; and
 e. Reception Label→2 (sub-tunnel indicator).

The forwarding tables on the LMA could be provided as follows:
 a. FID→XX→(description) 2.2.2.2, 1.1.1.1, 1718, 1056;
 b. MAG→3.3.3.3 (next hop through tunnel);
 c. Valid src/dst on the outer header→1.1.1.12, 3.3.3.3;
 d. innerLabel→3→(points to) TE-based tunnel information; and
 e. Reception Label→3 (sub-tunnel indicator).

On receipt of traffic on MAG 20 with the inner label as three from LMA 24, the associated traffic is analyzed to find the Reception Label and the associated FID. A similar activity would also occur on the LMA side.

In the case that the traffic flow starts before this procedure is completed, then the existing default tunnels between LMA 24 and MAG 20 can be used. Once the forwarding databases are populated, there is a switchover of the traffic from the default tunnel to the TE-based bi-directional tunnels. In further embodiments, at run-time, switchover from one TE tunnel to another tunnel in the upstream and downstream direction can also be done using this re-reg/de-reg PBU mechanism. The above exchange between LMA 24 and MAG 20 can occur specifically in such a manner, since it is MAG 20 that has knowledge of the UTP and the DTP.

Figure 3:
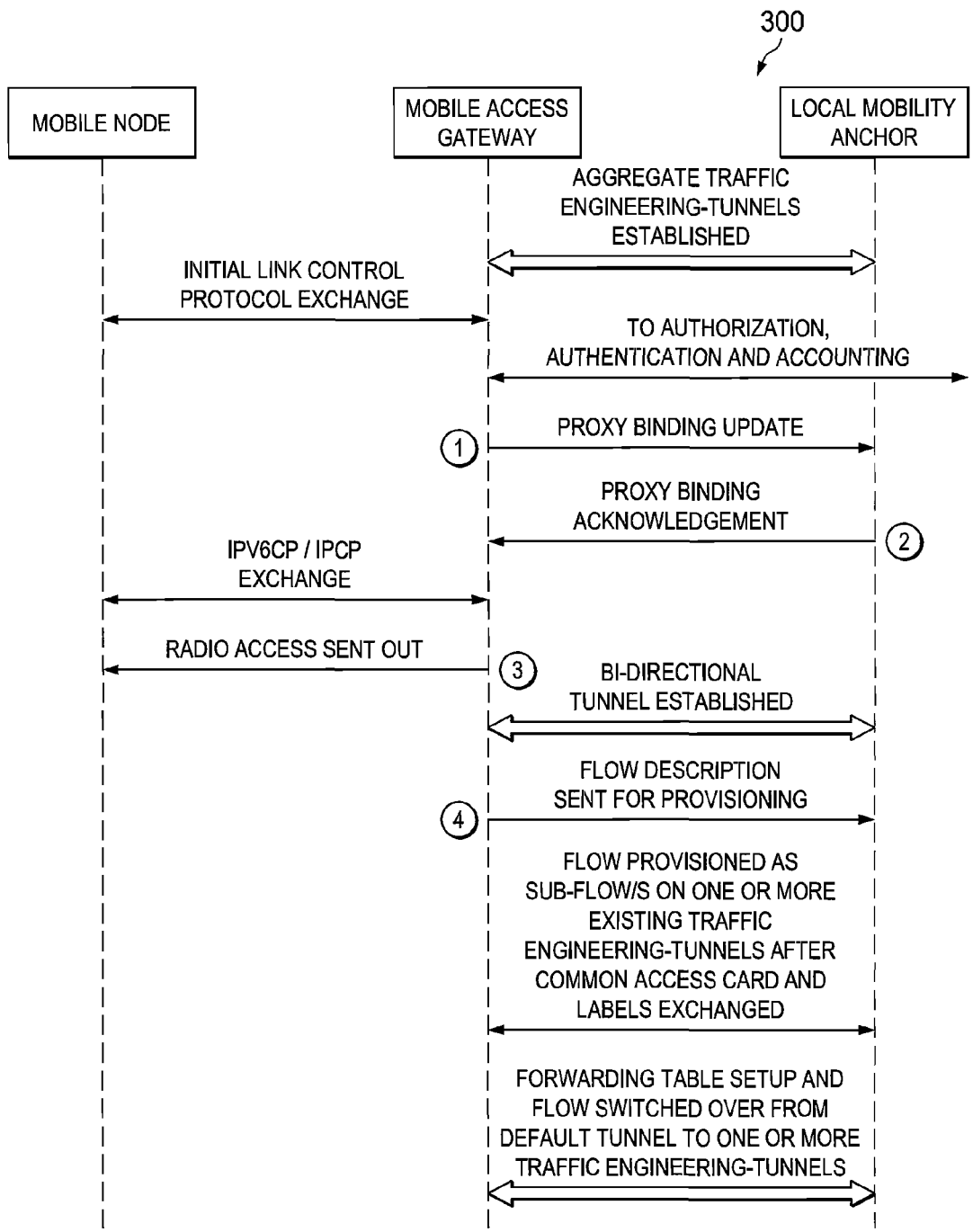
FIG. 3 is a simplified flow diagram illustrating details related to bidirectional GB TE tunnels associated with the communication system in accordance with one embodiment of the present disclosure.

Turning to FIG. 3, FIG. 3 is a simplified flow diagram 300 illustrating details related to example sub-flows associated with communication system 10 in accordance with one embodiment. Initially, between the MAG and LMA, an aggregate traffic engineering tunnel is established. An initial link control protocol exchange occurs between the mobile node and the MAG. Then, from the MAG, there is information exchanged between an authorization, authentication and accounting (AAA) element regarding this flow. In step 1 of FIG. 3, a proxy binding update can be sent from the MAG to the LMA. As discussed above, this includes information associated with establishing or assigning a sub-flow that is provisioned from the aggregate traffic engineering tunnel.

In step 2, a PBA can be sent from the LMA to the MAG. An IP control protocol exchange occurs between the mobile node and the MAG. In step 3, a bi-directional sub-flow tunnel is established. This is provisioned atop (inclusive of being derived from) the aggregate traffic engineering tunnel, which was established earlier. In step 4, a sub-flow description is sent for provisioning. A received flow from the mobile node is provisioned as a sub-flow by the MAG. Then, a forwarding table is setup and a flow is switched over from a default tunnel to the one or more traffic engineering tunnels.

Figure 4:
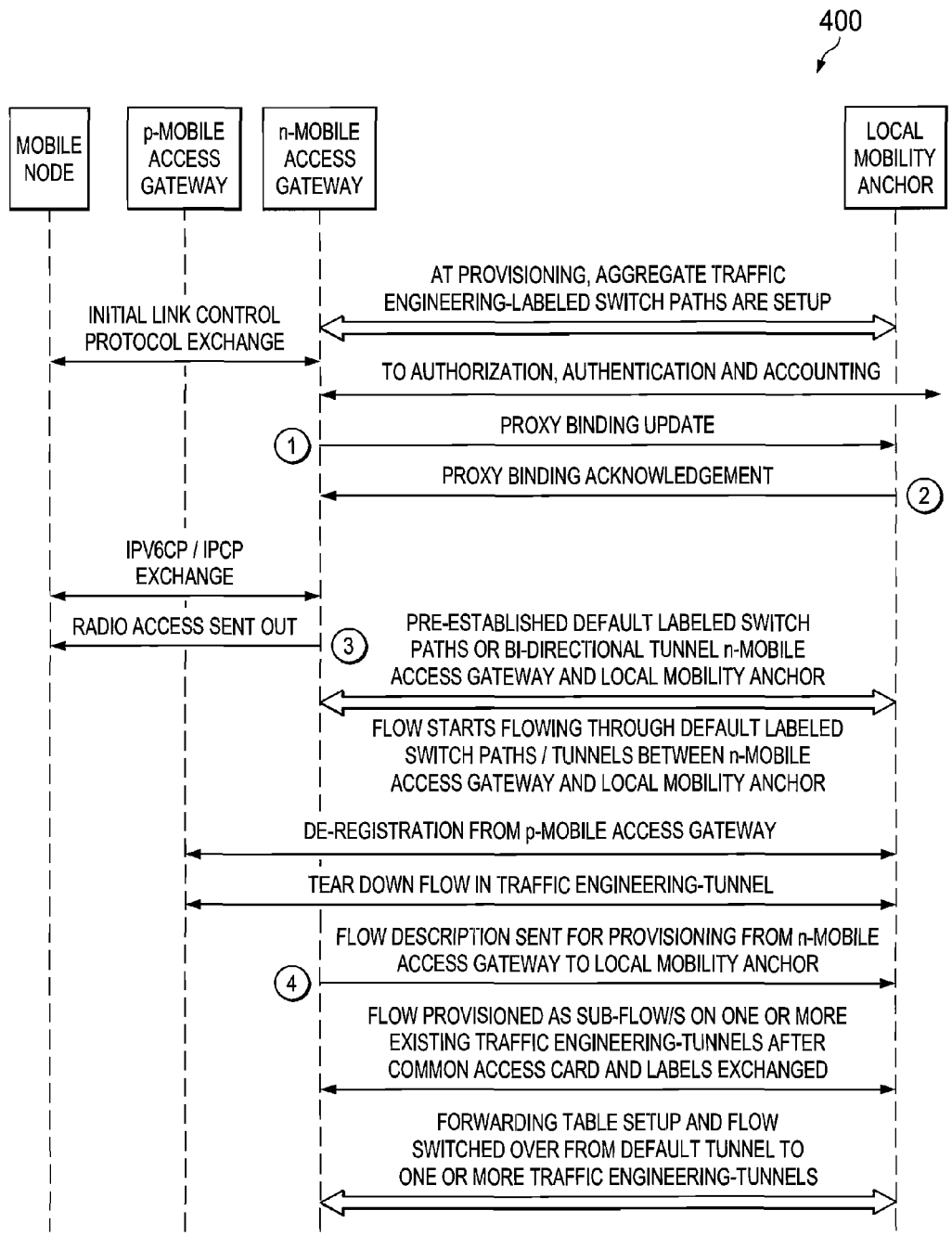
FIG. 4 is a simplified flow diagram illustrating details related to a handoff related to bidirectional GB TE tunnels of the communication system in accordance with one embodiment of the present disclosure.

Turning to FIG. 4, FIG. 4 is a simplified flow diagram 400 illustrating a handover involving mobile access gateways. In step 1, a proxy binding update occurs between the LMA and the n-MAG. In step 2, a proxy binding acknowledgment occurs between the n-MAG and the LMA. In step 3, a pre-established default labeled switch path or a bi-directional tunnel between the n-MAG and the LMA is established. In step 4, a flow description is sent for provisioning from the nMAG to the LMA.

Figure 5:
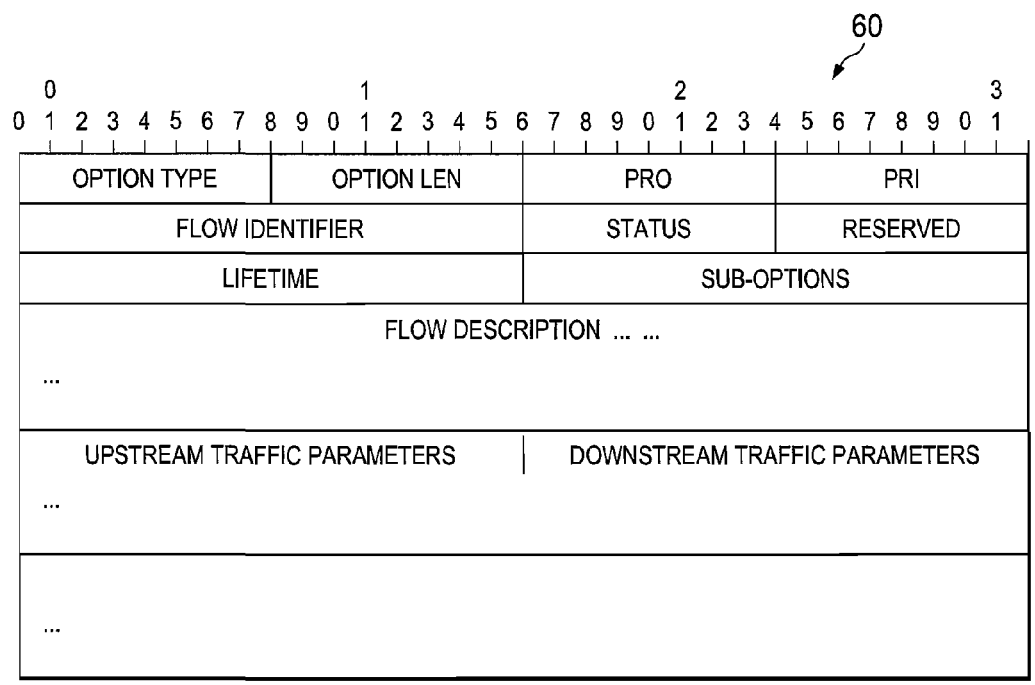
FIG. 5 is a simplified schematic diagram illustrating a header to be used in a sub-flow of the communication system in accordance with one embodiment of the present disclosure.

FIG. 5 is a simplified block diagram illustrating a flow identifier 60. Flow identifier 60 has been extended from a protocol data unit (PDU) (e.g., the PBA or the PBU). The flow identifier can be used to identify a sub-tunnel, upstream traffic parameters, and downstream traffic parameters, which can include QoS, rates, jitter, etc. Furthermore, the inner label (L1) and/or the inner label (L2) associated with the GB TE tunnel can be found in 'other information', as has been illustrated in FIG. 5. Additionally, the Reception Label can be provided in this area.

Figure 6A:
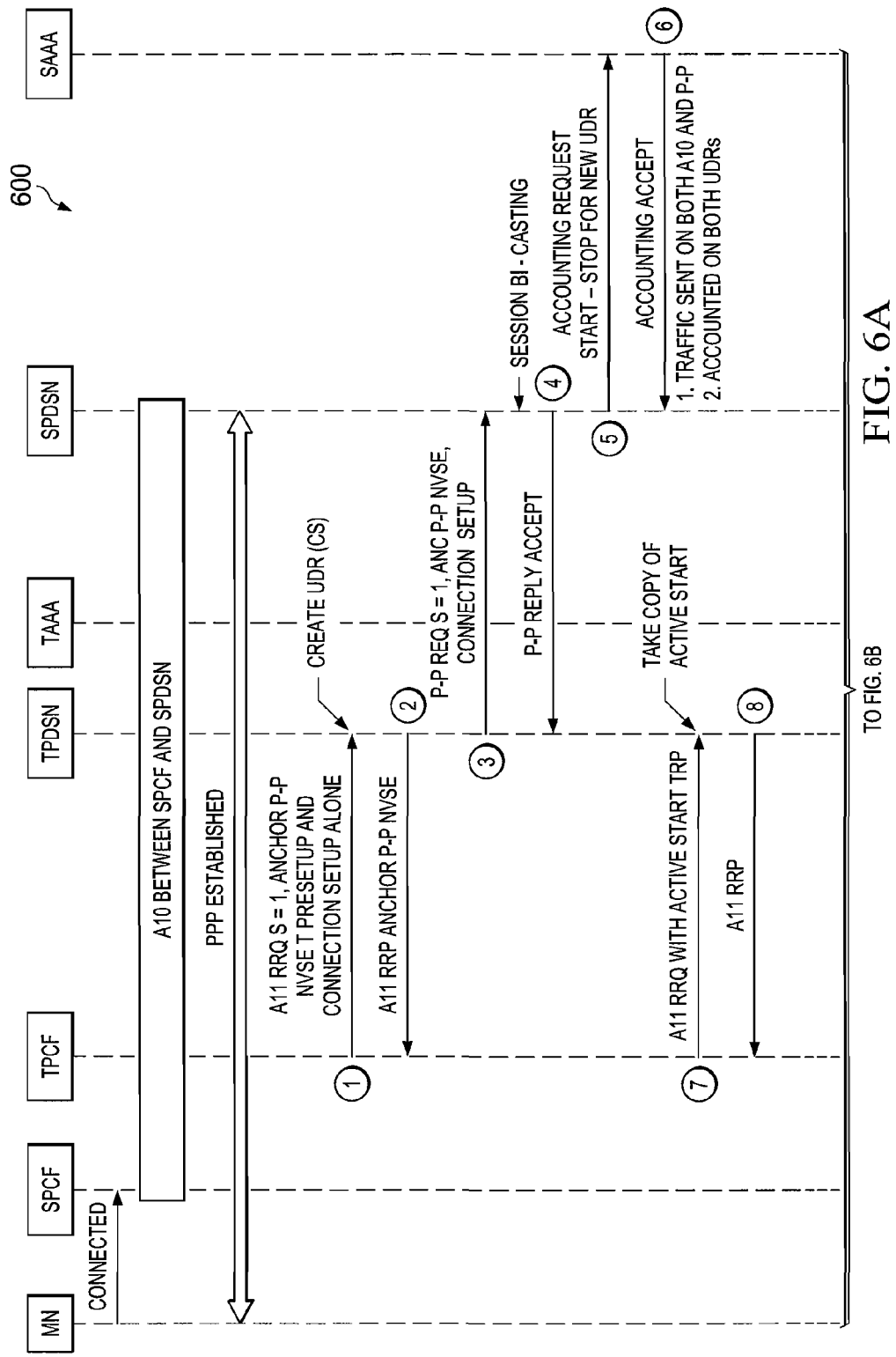
FIGS. 6A-B are simplified flow diagrams illustrating details related to a communication system in accordance with another embodiment of the present disclosure.
Figure 6B:
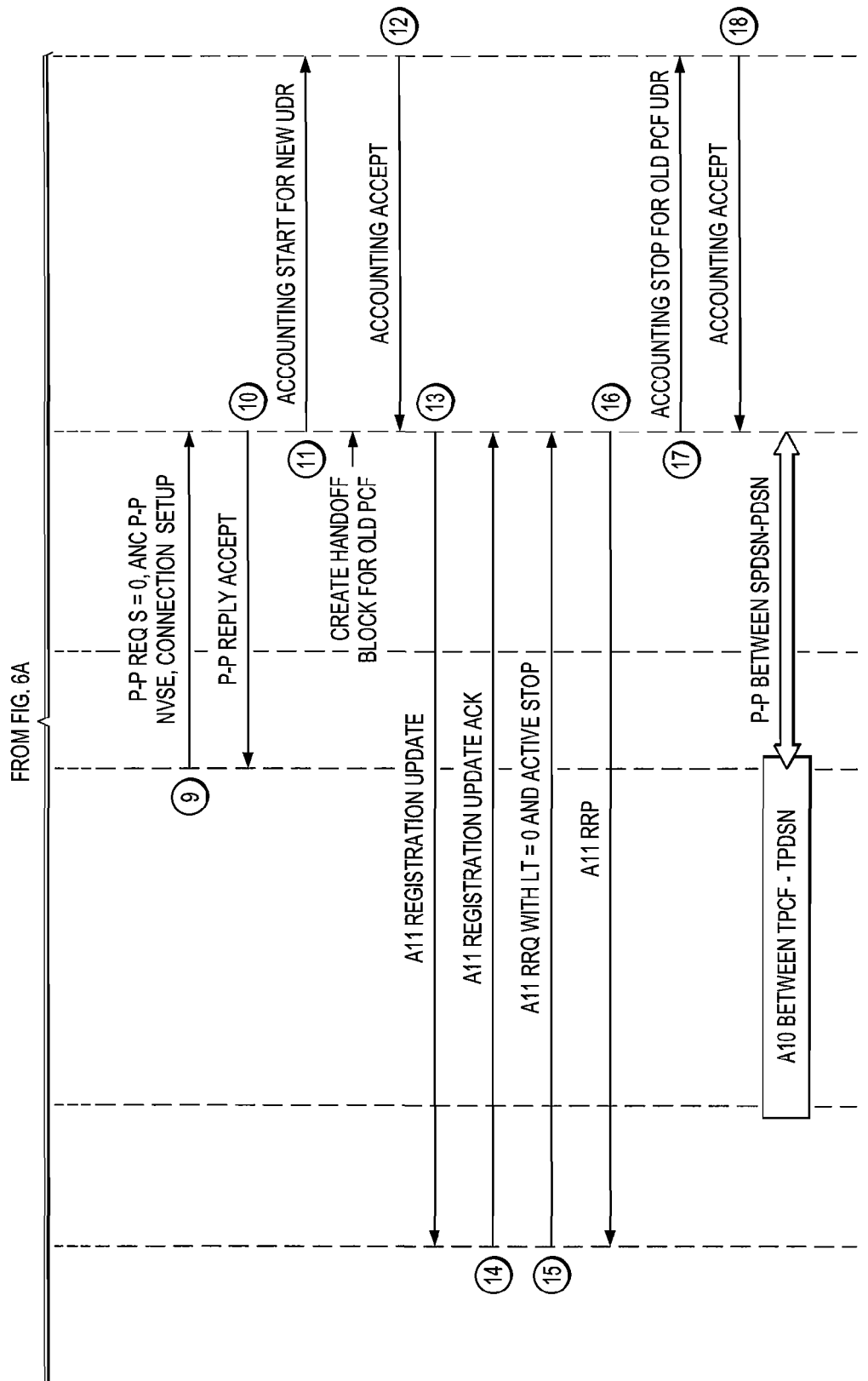

Turning to FIGS. 6A-B, FIGS. 6A-B are simplified flow diagrams 600 illustrating an example embodiment associated with a handoff between a serving (or source) PDSN (SPDSN) and a target PDSN (TPDSN). In certain examples, this can be performed in conjunction with the sub-flow provisioning of a GB TE aggregate tunnel, as explained previously. FIGS. 6A-B are generally directed toward establishing assured quality of service sub-flows in a guaranteed bandwidth TE-LSP between the MAG and the LMA. In a further embodiment, sub-flows are applied to an intervening leg between the TPDSN and the SPDSN. Generally, the activities of FIGS. 6A-B can ensure appropriate QoS for VoIP calls and other low latency flows between a TPDSN and an SPDSN in a point to point (P-P) handoff scenario.

Semantically, tools in the MPLS technology can be combined with the mobile wireless protocols in communication system 10 to solve several problems. These problems can include providing appropriate QoS guarantees for low-latency flows such as voice/video and mission critical flows. Additionally, the problems can include providing protection switching and explicit routing through appropriate paths having adequate bandwidth to carry the flows.

FIGS. 6A-B can be used to illustrate bi-directional LSPs being built between the SPDSN and the TPDSN using the generalized MPLS (GMPLS) style objects in the RSVP-TE messages. The mobile wireless protocols can be extended to accommodate an exchange of label information and corresponding flow descriptions (in terms of bandwidth utilized, etc.) between the SPDSN and the TPDSN. Normal Vendor/Organization Specific Extensions (NVSE) attributes can be modified to allow P-P handoff PDUs to carry extra information regarding flow details for a given mobile node. The deduction of bandwidth flows use certain heuristics and characteristics found in the low-latency flows. The configuration can employ CAC-ing of the respective flows onto the GB-TE-like LSPs, where the latter are already guaranteed bandwidth through the appropriate setup using a path calculation (i.e., involving CSPF on a PCE element) and a subsequent setup on the topology using RSVP-TE.

Note that the operations, activities, and mechanisms of FIGS. 1-5 can be applied to the P-P handoff case of FIGS. 6A-B. This may involve the substitution of the HA/LMA in FIGS. 1-5 with the SPDSN and, further, the substitution of the FA/MAG with the TPDSN. An analogous set of flow bandwidth deduction mechanisms that could detect the low-latency micro-flows could be applied in the downstream direction toward the mobile node. Additionally, this can involve using the packet filters for the same purpose in the upstream direction (toward the mobile node), and exchanging appropriate labels and CAC-ing these low-latency micro-flows onto the pre-provisioned GB-TE-like LSPs. In one embodiment, PPP tunnels usually established for carrying these A10s are substituted within a sub-TE tunnel LSP that carries an inner label.

The same aggregate GB-TE-like LSPs can be used and re-used for multiple mobile nodes as they migrate from the SPDSN to the TPDSN. Appropriate mechanisms that exist in the current standards can be used for transporting the control plane exchanges to establish the CAC-ing of the micro-flows. For example, session update and session update ACK messages could be extended with the capability to carry this signaling information. The upstream PDSN (e.g., SPDSN) can execute the decision to deduce the flow bandwidth for the downstream to the mobile node. The TFTs can help control the control plane exchanges. In a more specific scenario involving an MToP solution being deployed on the RAN side of the network, it is possible to stitch the RAN side tunnels with the IP elements of the network where the TPDSN and SPDSN reside.

In the paradigm of FIGS. 6A-6B, the role of controlling or initiating the control plane exchanges can be done by the upstream entity, as opposed to the case of FIGS. 1-5. Hence, in one general sense, the ensuing handoff flow diagrams leverage the upstream PDSN (SPDSN), which can perform the operations associated with deducing the flow bandwidth for the traffic downstream (toward the mobile node). Furthermore, the role of controlling or initiating control plane exchanges is done by the upstream entity (as opposed to the previously outlined scenarios in which the MAG is the downstream entity from the LMA that initiates the control plane exchange). The PDSN component is fulfilling this role and, therefore, can be provisioned with the appropriate TFTs. The roles in the network are being reversed (e.g., between the MAGs and/or the LMAs and the SPDSN and/or the TPDSN).

Accordingly, the SPDSN and the TPDSN may include a suitable processor, a memory element, and a quality of service enabler module such that it has a similar internal structure to that depicted in FIG. 1 with respect to MAG 20, 18. Either one, or both, of the SPDSN and the TPDSN may include software in order to achieve (or otherwise foster) the handoff operations, discussed with reference to FIGS. 6A-13.

Advantages of the operations outlined in FIGS. 6A-13 include the minimization of latency effects on the low-latency flows: when handed from the SPDSN to the TPDSN. Further, A10 elements within the PPP encapsulation can be CAC-ed in an aggregate manner atop these GB-TE-like LSPs. As a result of these approaches, there is no disruption in the VoIP calls, or in other mission critical applications such as security videos being streamed to the mobile node. Additionally, the stitching of the GB-TE with the LSPs in an MToP environment can provide an end-to-end solution for service providers.

Turning to the actual flow of FIGS. 6A-B, initially a PPP connection may be established between the mobile node and the SPDSN. Note that the target PCF (TPCF) is associated with the traffic specifications parameter embedded in the RSVP-TE messages that carry information related to the traffic flow for which the TE-LSP is to be setup. At step 1, interaction between the TPCF and the target PDSN (TPDSN) can occur in order to create the usage data record (UDR). At step 2, additional interaction between these components occurs, while step 3 provides the connection set up between the TPDSN and the SPDSN. A P-P reply accept message is communicated to the TPDSN at step 4. At step 5, an accounting request start/stop message is communicated to the SAAA. Step 6 represents an accounting accept message being sent to the SPDSN. Steps 7-8 are associated with the A11 connection, which includes taking a copy of the active start. A connection set up is involved in step 9, where a P-P reply accept message is communicated in step 10. A handoff block is created at step 11, and an accounting accept message is communicated at step 12. Steps 13-16 involve registration activities, along with an active stop for the A11 connection. Steps 17-18 involve accounting messaging, where the resultant of these activities is an effective connection between the SPDSN-PDSN.

Figure 7:
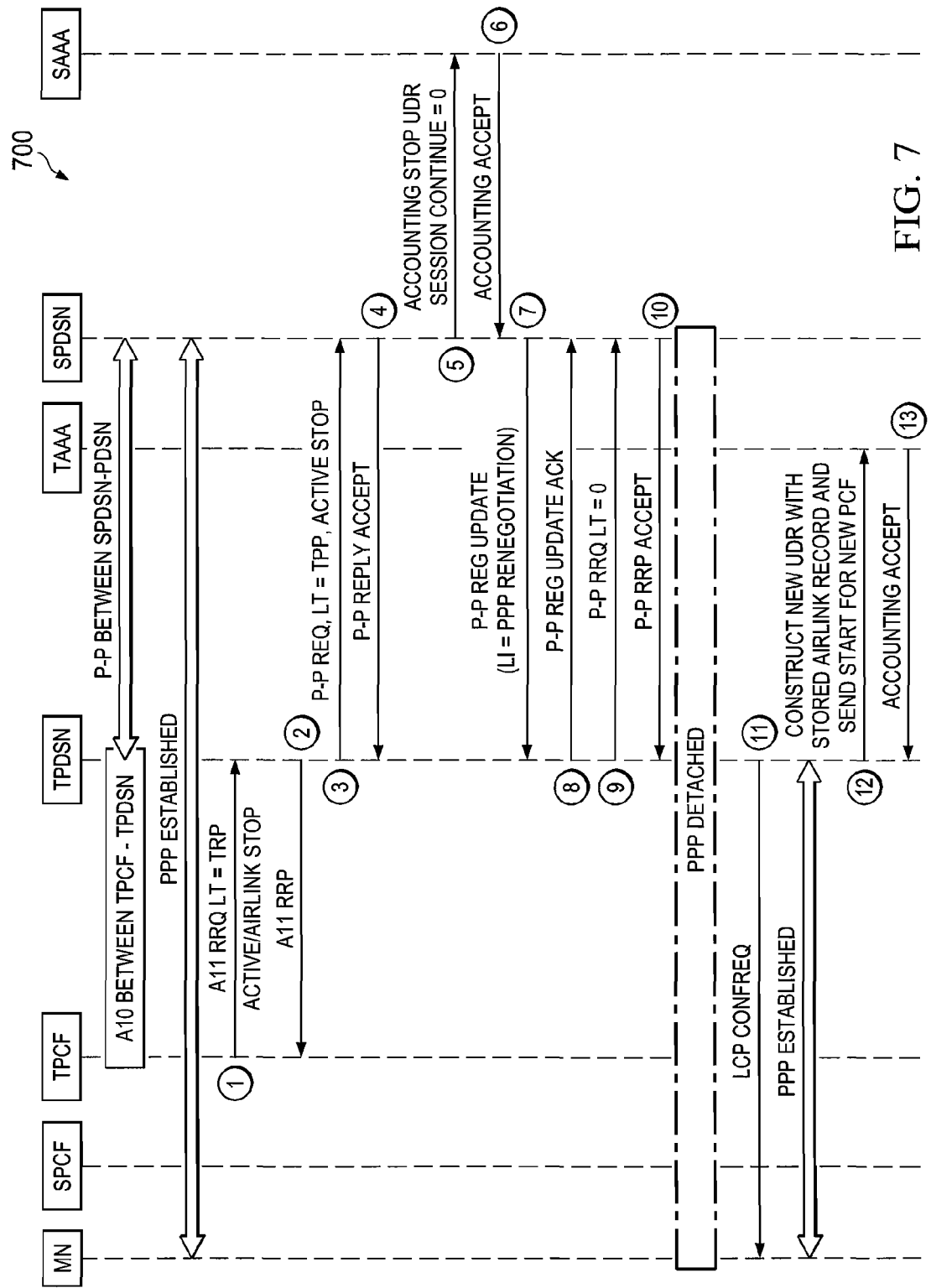
FIG. 7 is another simplified flow diagram illustrating operational aspects of the communication system in accordance with one embodiment of the present disclosure.

FIG. 7 is a simplified flow diagram 700 illustrating the mobile node moving to a dormant stage after a fast handoff has occurred. This particular flow includes an initial establishment of a PPP connection between the mobile node and the SPDSN. Note that in particular instances, the following steps can be performed before provisioning sub-flows, as discussed with reference to FIGS. 1-5. Referring to the particular operations of FIG. 7, at steps 1-2, interaction between the TPCF and the TPDSN occurs involving the A11 connection. An active stop message is communicated to the SPDSN at step 3, where a suitable reply accept message is communicated at step 4. At step 5, an accounting stop message is communicated to the SAAA, where an accounting accept message is communicated back at step 6. At steps 7-10, renegotiation activity occurs, along with suitable update and accept messages being exchanged between the TPDSN and the SPDSN. The PPP is subsequently detached, where link control protocol (LCP) messaging occurs in step 11. Start messages and accounting accept messages are then exchanged between the TPDSN and the TAAA in steps 12-13.

Figure 8:
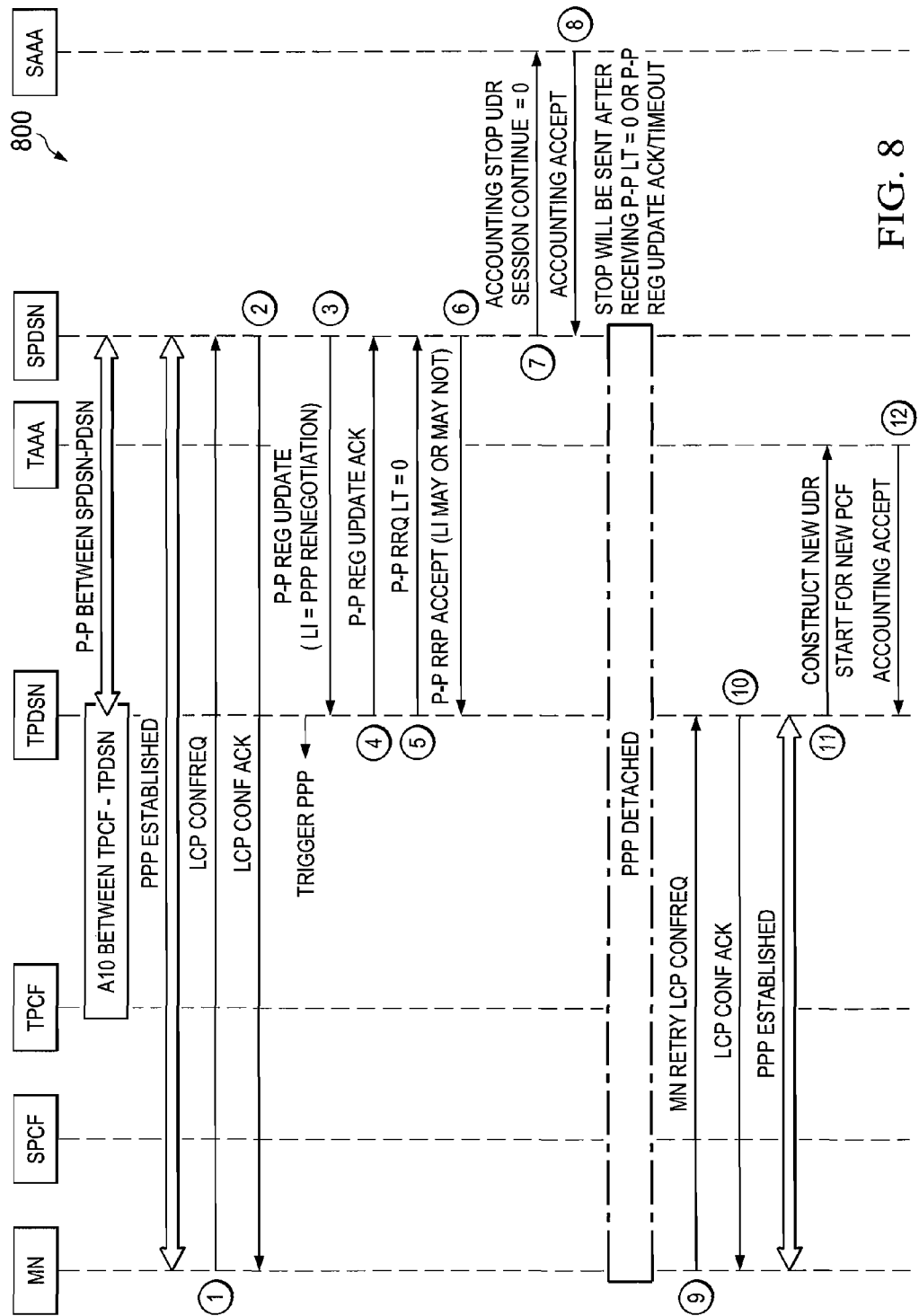
FIG. 8 is another simplified flow diagram illustrating operational aspects of the communication system in accordance with one embodiment of the present disclosure.

FIG. 8 is a simplified flow diagram 800 illustrating a PPP renegotiation from a mobile node after a fast handoff. In this particular instance, the PPP can be re-established between the mobile node and the TPDSN, and then can be used as sub-flows in later steps. A PPP connection may be initially established between the mobile node and the SPDSN. LCP request and acknowledgment messages may be exchanged in steps 1-2. In step 3, a P-P registration update is sent to the TPDSN, where steps 4-6 include an acknowledgement and accept messaging being exchanged. An accounting stop message is sent in step 7 to the SAAA, which responds with an accounting accept message in step 8. The PPP is subsequently detached, where a mobile node retry occurs at step 9, and an LCP acknowledgment occurs at step 10. A new UDR start message is exchanged at step 11, while an accounting accept message is communicated at step 12 to the TPDSN.

Figure 9:
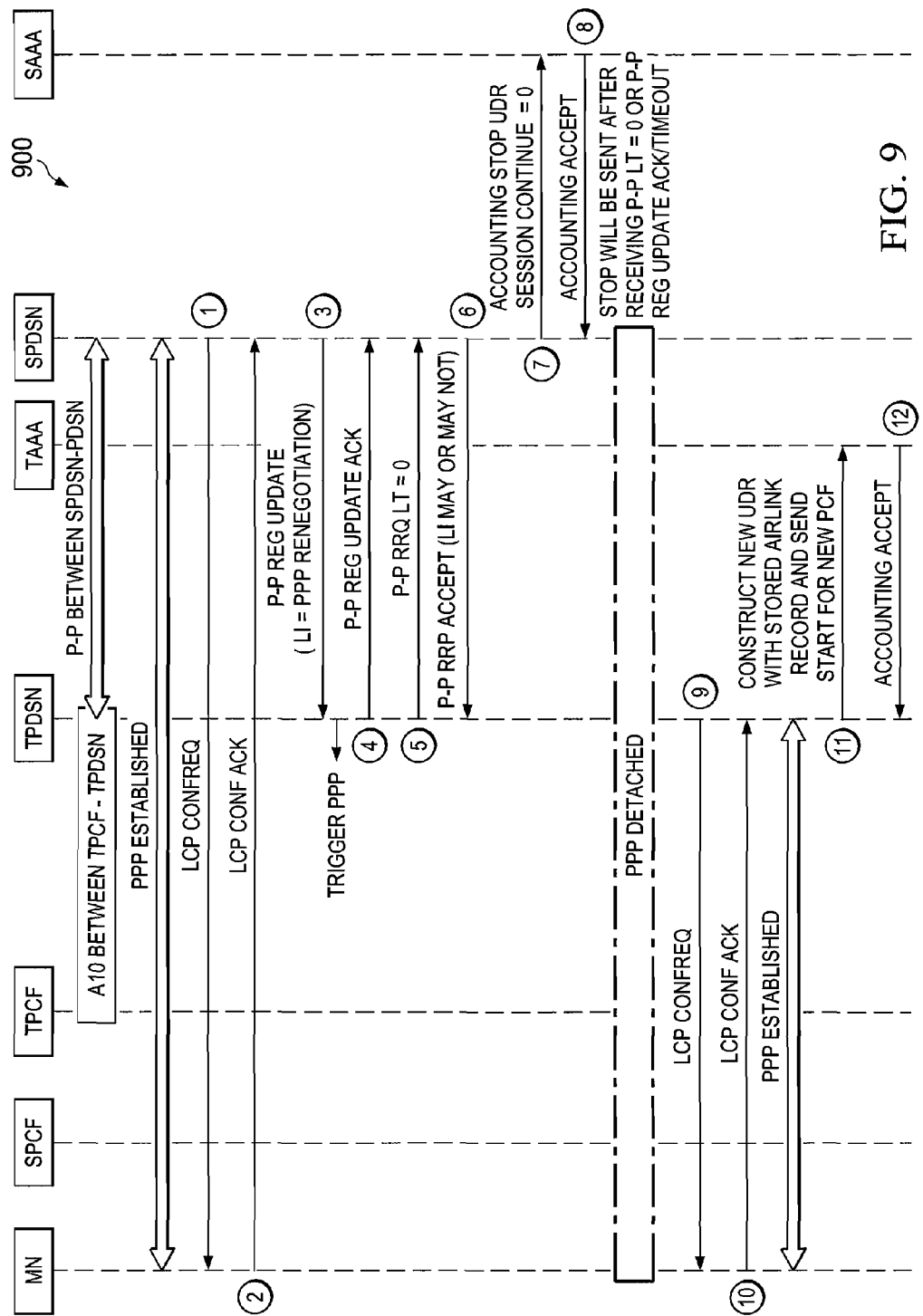
FIG. 9 is another simplified flow diagram illustrating operational aspects of the communication system in accordance with one embodiment of the present disclosure.

FIG. 9 is a simplified flow diagram 900 illustrating a PPP renegotiation from an SPDSN after a fast handoff. This particular flow may begin initially where a PPP is established. The LCP request and acknowledgment can occur at steps 1-2. Steps 3-6 address the P-P registration update activities, which includes an acknowledgment and an accept message exchange sent to the TPDSN. An accounting stop message is sent from the SPDSN to the SAAA at step 7. At step 8, an accounting accept message is sent to the SPDSN. The PPP is then detached, where LCP messaging occurs in steps 9-10. The PPP is established at this juncture, where a new UDR is constructed at step 11, and an accounting accept message is sent at step 12 to the TPDSN.

Figure 10:
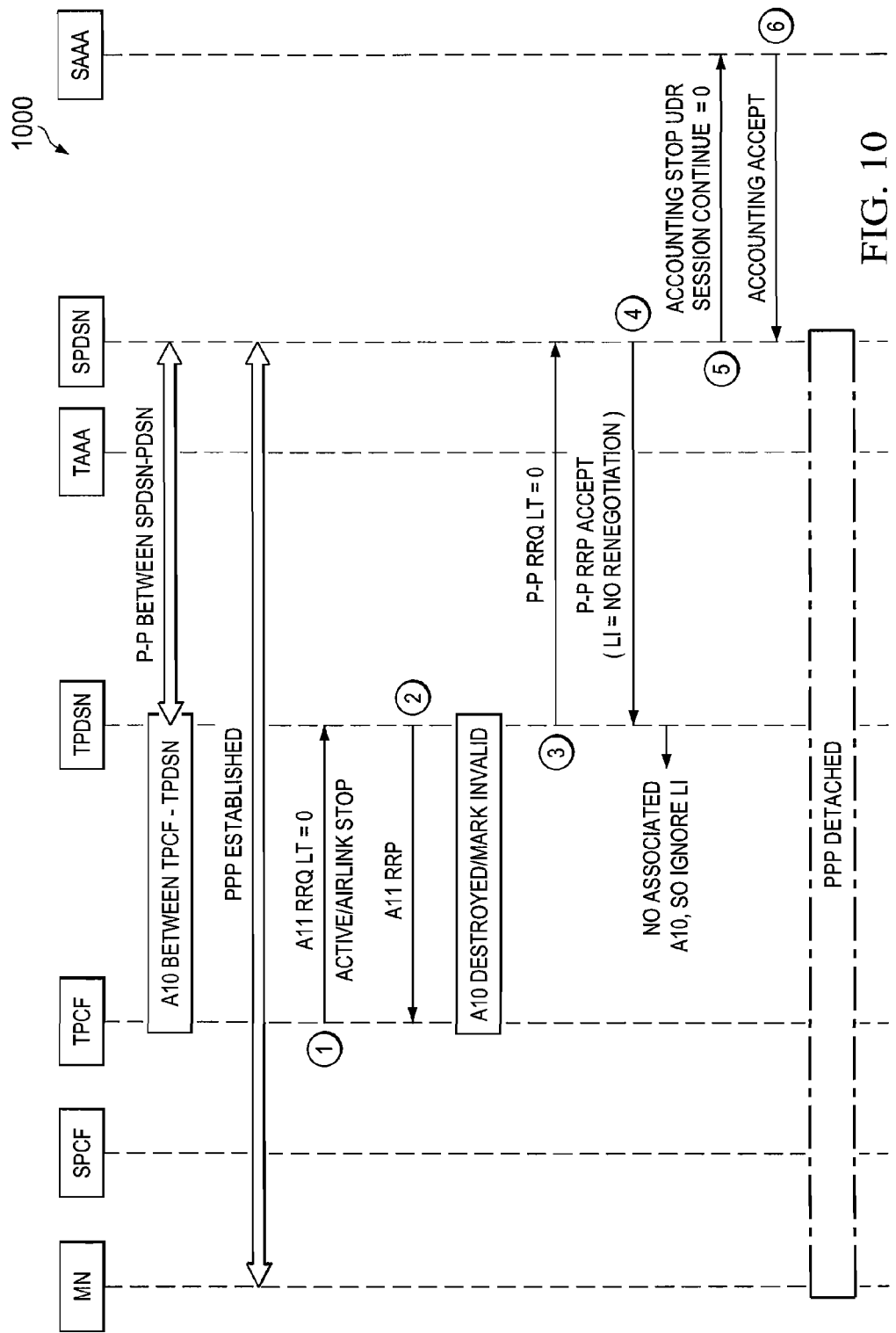
FIG. 10 is another simplified flow diagram illustrating operational aspects of the communication system in accordance with one embodiment of the present disclosure.

FIG. 10 is a simplified flow diagram 1000 illustrating a termination of particular connections by a target PCF (TPCF) after a fast handoff. Initially, a PPP can be established between the mobile mode and the SPDSN. At step 1, an active/airlink stop message is communicated to the TPDSN, while an A11 registration reply is sent back to the TPCF at step 2. The A10 is subsequently destroyed (or marked as invalid). Steps 3-4 are associated with P-P messaging, while the accounting stop and accept messages are exchanged in steps 5-6. The PPP link is subsequently detached as a result of these activities.

Figure 11:
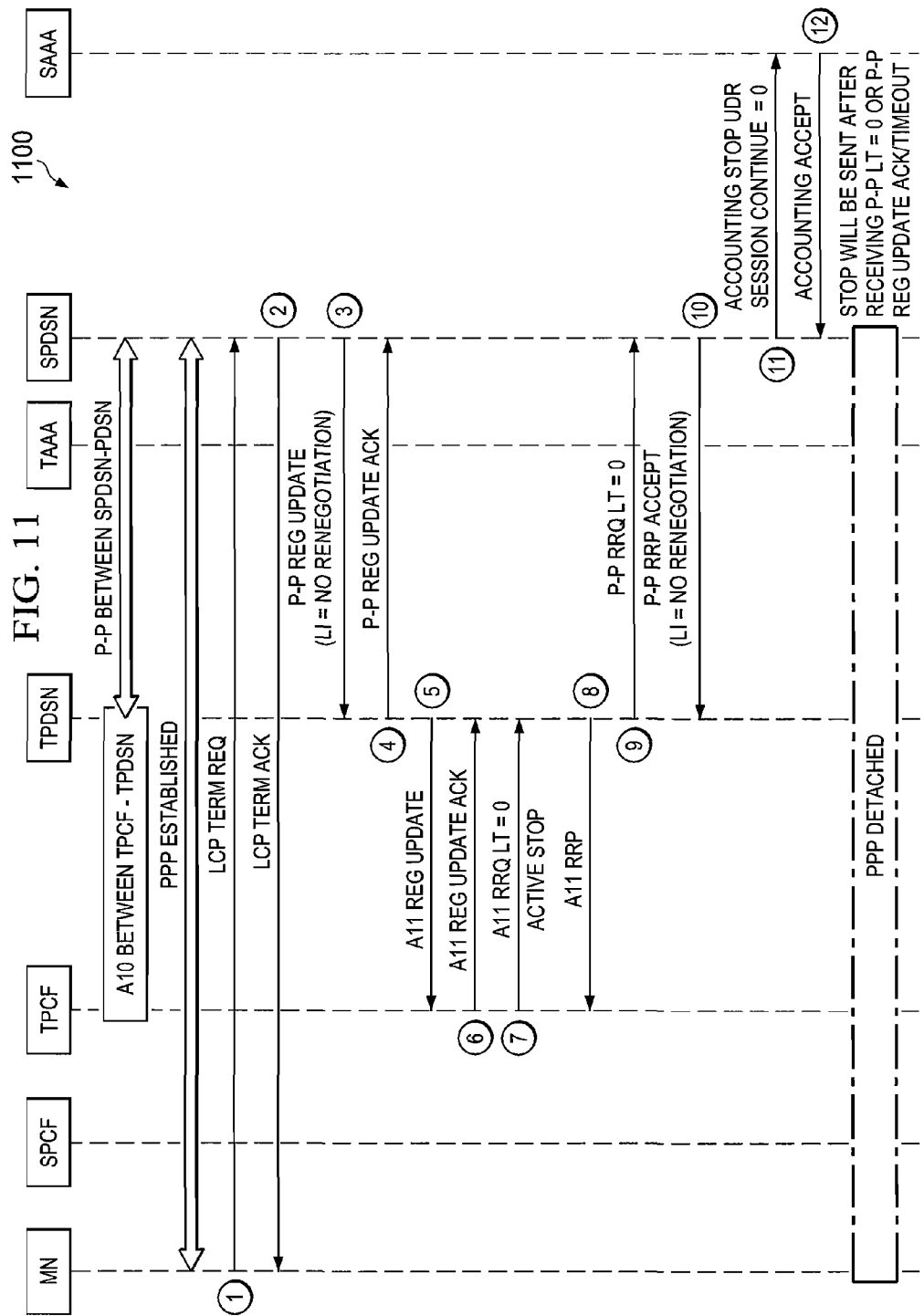
FIG. 11 is another simplified flow diagram illustrating operational aspects of the communication system in accordance with one embodiment of the present disclosure.

Turning to FIG. 11, FIG. 11 is a simplified flow diagram 1100 illustrating termination of connections by a mobile node after a fast handoff. Initially, a PPP connection is established between the mobile node and the SPDSN. Steps 1-2 are associated with an LCP request and acknowledgment, which involves the mobile node and the SPDSN. Steps 3-4 are associated with a P-P registration update and acknowledgment, while steps 4-8 are associated with the A11 registration and active stop messaging. Step 9 involves a P-P request, a P-P accept message is communicated to the TPDSN at step 10, while the accounting stop can be communicated to the SAAA at step 11. An accounting accept message is communicated at step 12. The resultant of these activities is the PPP link being detached.

Figure 12:
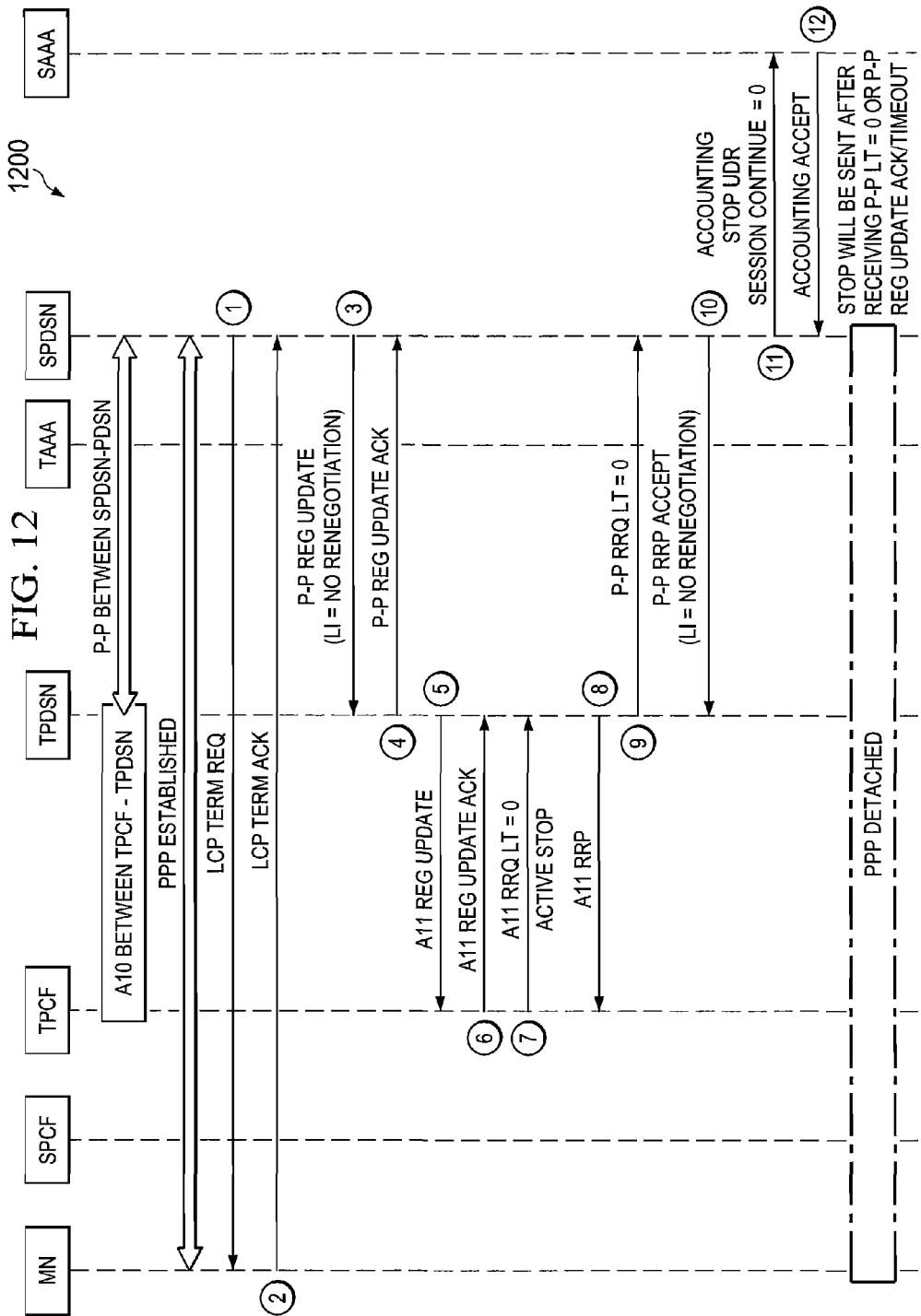
FIG. 12 is another simplified flow diagram illustrating operational aspects of the communication system in accordance with one embodiment of the present disclosure.

FIG. 12 is a simplified flow diagram 1200 illustrating a termination of connections by a SPDSN after a fast handoff. A PPP connection can be established initially, where LCP messaging is exchanged in steps 1-2. Steps 3-4 are associated with registration updates, while steps 5-8 are associated with the A11 connection. The P-P messaging can occur in steps 9-10. The accounting stop and accept messages occur in steps 11-12. As was the case previously, the PPP link is suitably detached as a result of these activities.

Figure 13:
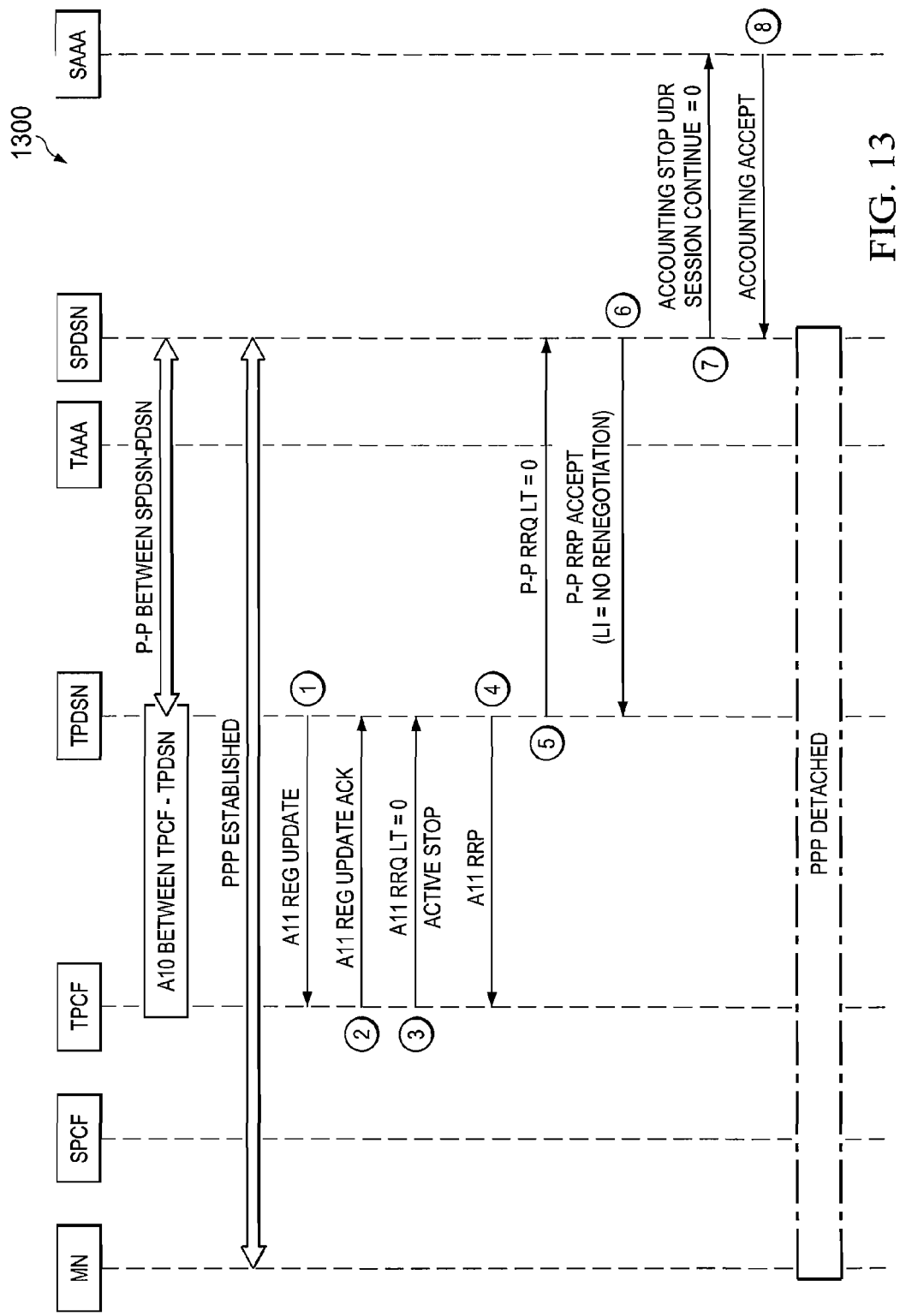
FIG. 13 is another simplified flow diagram illustrating operational aspects of the communication system in accordance with one embodiment of the present disclosure.

FIG. 13 is a simplified flow diagram 1300 illustrating termination of connections by the TPDSN after a fast handoff. A PPP connection can be established initially, where the A11 registration messaging occurs in steps 1-4. In steps 5-6, the P-P messaging may be exchanged between the TPDSN and the SPDSN. Steps 7-8 are associated with accounting messages that are exchanged between the SPDSN and the SAAA. The PPP link is effectively detached following these activities.

Note that in certain example implementations, the flow management and control functions outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element (as shown in FIGS. 1-2) can store data used for the operations described herein. This includes the memory element being able to store software, logic, code, or processor instructions that can be executed to carry out the activities described in this Specification. A processor can execute any type of instructions associated with the data to achieve the operations detailed herein in this Specification. In one example, the processor (as shown in FIGS. 1-2) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

In one example implementation, QoSE modules 30a-b include software in order to achieve the flow management functions outlined herein. These activities can be facilitated by mobile nodes 12, 14, 16, and/or LMAs 24, 26, and/or MAG 18, 20, and/or the TPDSN, the SPDSN. Additionally, the handover functions and/or the additional operations being performed in FIGS. 6A-13 can include additional (or different) software or hardware in these same devices (e.g., MAG, LMA, mobile node) in order to achieve the activities described in FIGS. 6A-13. In one instance, these handover activities of FIGS. 6A-13 are accommodated and performed by QoSE modules 30a-b, as the TPDSN and the SPDSN are being substituted for the MAG and/or the LMA in certain environments or scenarios.

Mobile nodes 12, 14, 16, and/or LMAs 24, 26, and/or MAG 18, 20 and/or the TPDSN, the SPDSN can include memory elements for storing information to be used in achieving the intelligent flow management, as outlined herein. Additionally, mobile nodes 12, 14, 16, and/or LMAs 24, 26, and/or MAG 18, 20 and/or the TPDSN, the SPDSN may include a processor that can execute software or an algorithm to perform the flow management activities, as discussed in this Specification. These devices may further keep information in any suitable memory element (random access memory (RAM), ROM, EPROM, EEPROM, ASIC, etc.), software, hardware, or in any other suitable component, device, element, or object where appropriate and based on particular needs. Any possible memory items (e.g., database, table, cache, etc.) should be construed as being encompassed within the broad term 'memory element.' Similarly, any of the potential processing elements, modules, and machines described in this Specification should be construed as being encompassed within the broad term 'processor.'

Note that with the examples provided herein, interaction may be described in terms of two or three elements. However, this has been done for purposes of clarity and example only. In certain cases, it may be easier to describe one or more of the functionalities of a given set of flows by only referencing a limited number of network elements. It should be appreciated that communication system 10 (and its teachings) are readily scalable and can accommodate a large number of users, flows, and tunnels, as well as more complicated/sophisticated arrangements and configurations. Accordingly, the examples provided herein should not limit the scope or inhibit the broad teachings of communication system 10 as potentially applied to a myriad of other architectures.

It is also important to note that the steps discussed with reference to FIGS. 1-13 illustrate only some of the possible scenarios that may be executed by, or within, communication system 10. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 in that any suitable arrangements, chronologies, configurations, and timing mechanisms may be provided without departing from the teachings of the present disclosure.

Although the present disclosure has been described in detail with reference to particular embodiments, it should be understood that various other changes, substitutions, and alterations may be made hereto without departing from the spirit and scope of the present disclosure. For example, although the present disclosure has been described as operating in specific types of MAG and PDSN environments or arrangements, the present disclosure may be used in any network environment (e.g., WiMAX, LTE, GGSN, GSM, etc.) that could benefit from such technology. Virtually any configuration that seeks to intelligently control flow settings could enjoy the benefits of the present disclosure. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A method for managing a first communication flow and a second communication flow in a network environment, the second communication flow associated with voice data and/or video data, comprising:

receiving, at a mobile access gateway, a request from a mobile node for an Internet protocol (IP) address;

establishing a point-to-point (PPP) link between the mobile node and the mobile access gateway;

provisioning a first tunnel associated with the first communication flow for the mobile node between the local mobility anchor of the mobile node and the mobile access gateway, wherein said first tunnel is a guaranteed bandwidth traffic-engineered tunnel; and applying Quality of Service (QoS) parameters associated with the second communication flow against the guaranteed bandwidth of the first tunnel to ensure the first tunnel has the capacity to carry the second communication flow;

provisioning a sub-tunnel within the first tunnel for transporting the second communication flow, wherein the sub-tunnel consumes a portion of the available bandwidth of the first tunnel.

2. The method of claim 1, wherein a call admission control (CAC) mechanism is used to apply Quality of Service (QoS) parameters associated with the second communication flow against the guaranteed bandwidth of the first tunnel.

3. The method of claim 1, wherein an inner label is installed in a header of a packet associated with the second communication flow in order to identify the sub-tunnel.

4. The method of claim 1, further comprising:
determining whether the second communication flow is associated with voice data or video data based on common characteristics in voice or video communication flows.

5. The method of claim 1, wherein a traffic flow template (TFT) and a packet filter are provisioned for the first communication flow in conjunction with the mobile node roaming into a network.

6. The method of claim 1, wherein an entry in a database is provisioned for the first communication flow, and wherein the entry includes a care of address (CoA) through which the mobile node is reachable.

7. The method of claim 1, wherein an advertisement message is sent to the mobile node to indicate a home address (HoA) associated with the mobile node, and wherein a packet exchange indicates that a CoA is to be associated with the HoA.

8. Logic encoded in one or more non-transitory tangible media that includes code for execution and when executed by a processor operable to perform operations comprising:
receiving, at a mobile access gateway, a request from a mobile node for an Internet protocol (IP) address;
establishing a point-to-point (PPP) link between the mobile node and the mobile access gateway;
provisioning a first tunnel associated with the first communication flow for the mobile node between the local mobility anchor of the mobile node and the mobile access gateway, wherein said first tunnel is a guaranteed bandwidth traffic-engineered tunnel; and
applying Quality of Service (QoS) parameters associated with the second communication flow against the guaranteed bandwidth of the first tunnel to ensure the first tunnel has the capacity to carry the second communication flow;
provisioning a sub-tunnel within the first tunnel for transporting the second communication flow, wherein the sub-tunnel consumes a portion of the available bandwidth of the first tunnel.

9. The logic of claim 8, wherein a call admission control (CAC) mechanism is used to apply Quality of Service (QoS) parameters associated with the second communication flow against the guaranteed bandwidth of the first tunnel.

10. The logic of claim 8, wherein an entry in a database is provisioned for the first communication flow, and wherein the entry includes a care of address (CoA) through which the mobile node is reachable.

11. The logic of claim 8, wherein an inner label is installed in a header of a packet associated with the second communication flow in order to identify the sub-tunnel.

12. The logic of claim 8, wherein the operations further comprises:
determining whether the second communication flow is associated with voice data or video data based on common characteristics in voice or video communication flows.

13. The logic of claim 8, wherein a traffic flow template (TFT) and a packet filter are provisioned for the first communication flow in conjunction with the mobile node roaming into a network.

14. The logic of claim 8, wherein an advertisement message is sent to the mobile node to indicate a home address (HoA) associated with the mobile node, and wherein a packet exchange indicates that a CoA is to be associated with the HoA.

15. A mobile access gateway for managing a first communication flow and a second communication flow in a network environment, the second communication flow associated with voice data and/or video data, the mobile access gateway configured for:
receive, at a mobile access gateway, a request from a mobile node for an Internet protocol (IP) address;
establish a point-to-point (PPP) link between the mobile node and the mobile access gateway;
provision a first tunnel associated with the first communication flow for the mobile node between the local mobility anchor of the mobile node and the mobile access gateway, wherein said first tunnel is a guaranteed bandwidth traffic-engineered tunnel; and
apply Quality of Service (QoS) parameters associated with the second communication flow against the guaranteed bandwidth of the first tunnel to ensure the first tunnel has the capacity to carry the second communication flow;
provision a sub-tunnel within the first tunnel for transporting the second communication flow, wherein the sub-tunnel consumes a portion of the available bandwidth of the first tunnel.

16. The mobile access gateway of claim 15, wherein a call admission control (CAC) mechanism is used to apply Quality of Service (QoS) parameters associated with the second communication flow against the guaranteed bandwidth of the first tunnel.

17. The mobile access gateway of claim 15, wherein an inner label is installed in a header of a packet associated with the second communication flow in order to identify the sub-tunnel.

18. The mobile access gateway of claim 15 is further configured to determine whether the second communication flow is associated with voice data or video data based on common characteristics in voice or video communication flows.

19. The mobile access gateway of claim 15, wherein a traffic flow template (TFT) and a packet filter are provisioned for the first communication flow in conjunction with the mobile node roaming into a network.

20. The mobile access gateway of claim 15, wherein an advertisement message is sent to the mobile node to indicate a home address (HoA) associated with the mobile node, and wherein a packet exchange indicates that a CoA is to be associated with the HoA.

* * * * *